(12) United States Patent
Choe et al.

(10) Patent No.: US 10,469,846 B2
(45) Date of Patent: Nov. 5, 2019

(54) DYNAMIC RANGE COMPRESSION OF ULTRASOUND IMAGES

(71) Applicant: Vave Health, Inc., Redwood City, CA (US)

(72) Inventors: Jung Woo Choe, Sunnyvale, CA (US); Stefan Craciun, San Carlos, CA (US); Amin Nikoozadeh, San Carlos, CA (US)

(73) Assignee: Vave Health, Inc., Redwood City, CA (US)

( * ) Notice: Subject to any disclaimer, the term of this patent is extended or adjusted under 35 U.S.C. 154(b) by 216 days.

(21) Appl. No.: 15/470,793

(22) Filed: Mar. 27, 2017

(65) Prior Publication Data

US 2018/0278944 A1    Sep. 27, 2018

(51) Int. Cl.
  *G06K 9/00* (2006.01)
  *H04N 19/184* (2014.01)
  *H04N 19/98* (2014.01)
  *H04N 19/96* (2014.01)

(52) U.S. Cl.
  CPC ........... *H04N 19/184* (2014.11); *H04N 19/96* (2014.11); *H04N 19/98* (2014.11)

(58) Field of Classification Search
  CPC ....... H04N 19/184; H04N 19/96; H04N 19/98
  USPC ....................................................... 382/239
  See application file for complete search history.

(56) References Cited

U.S. PATENT DOCUMENTS

| | | |
|---|---|---|
| 839,442 A | 12/1906 | Jesse |
| 4,413,629 A | 11/1983 | Durley, III |
| 4,589,284 A | 5/1986 | Breimesser et al. |
| 5,396,890 A | 3/1995 | Weng |
| 5,590,658 A | 1/1997 | Chiang et al. |
| 5,603,323 A | 2/1997 | Pflugrath et al. |
| 5,640,960 A | 6/1997 | Jones et al. |
| 5,778,177 A | 7/1998 | Azar |

(Continued)

FOREIGN PATENT DOCUMENTS

| | | |
|---|---|---|
| CN | 102525557 A | 7/2012 |
| CN | 103284735 A | 9/2013 |

(Continued)

OTHER PUBLICATIONS

Ahn, et al. A new wireless hand-held ultrasound system with smartphone, tablet for mobile healthcare. 2015 IEEE International Ultrasonics Symposium Proceedings.

(Continued)

*Primary Examiner* — Van D Huynh
(74) *Attorney, Agent, or Firm* — Wilson Sonsini Goodrich & Rosati

(57) ABSTRACT

Ultrasound image data on a handheld imaging probe can be compressed on the handheld imaging probe prior to transmission from the probe in order to decrease the amount of data transmitted from the probe. The compressed data may comprise compressed pixels to maintain spatial image resolution. The compression circuitry may comprise an amount of memory related to a dynamic range of the compressed data that is independent of the dynamic range of the input data, which can decrease memory, power consumption, and latencies. The compression circuitry can be configured to pipeline data such as image data in accordance with clock cycles, such that throughput of outputting data words is increased.

10 Claims, 10 Drawing Sheets

(56) References Cited

U.S. PATENT DOCUMENTS

| | | |
|---|---|---|
| 5,795,297 A | 8/1998 | Daigle |
| 5,817,024 A | 10/1998 | Ogle et al. |
| 5,845,004 A * | 12/1998 | Banjanin ............ G01S 7/52071 382/128 |
| 5,851,186 A | 12/1998 | Wood et al. |
| 5,865,749 A | 2/1999 | Doten et al. |
| 5,891,030 A | 4/1999 | Johnson et al. |
| 5,944,659 A | 8/1999 | Flach et al. |
| 5,964,709 A | 10/1999 | Chiang et al. |
| 5,983,123 A | 11/1999 | Shmulewitz |
| 6,117,085 A | 9/2000 | Picatti et al. |
| 6,135,961 A | 10/2000 | Pflugrath et al. |
| 6,142,946 A | 11/2000 | Hwang et al. |
| 6,241,673 B1 | 6/2001 | Williams |
| 6,248,072 B1 | 6/2001 | Murkin |
| 6,248,073 B1 | 6/2001 | Gilbert et al. |
| 6,306,089 B1 | 10/2001 | Coleman et al. |
| 6,368,279 B1 | 4/2002 | Liu |
| 6,436,040 B1 | 8/2002 | Collamore et al. |
| 6,440,071 B1 | 8/2002 | Slayton et al. |
| 6,440,072 B1 | 8/2002 | Schuman et al. |
| 6,464,636 B1 | 10/2002 | Kinicki et al. |
| 6,471,651 B1 | 10/2002 | Hwang et al. |
| 6,530,887 B1 | 3/2003 | Gilbert et al. |
| 6,592,521 B1 | 7/2003 | Urbano et al. |
| 6,669,633 B2 | 12/2003 | Brodsky et al. |
| 6,755,789 B2 | 6/2004 | Stringer et al. |
| 6,780,154 B2 | 8/2004 | Hunt et al. |
| 6,783,493 B2 | 8/2004 | Chiang et al. |
| 6,969,352 B2 | 11/2005 | Chiang et al. |
| 7,022,075 B2 | 4/2006 | Grunwald et al. |
| 7,115,093 B2 | 10/2006 | Halmann et al. |
| 7,141,020 B2 | 11/2006 | Poland et al. |
| 7,199,738 B2 | 4/2007 | Han et al. |
| 7,223,242 B2 | 5/2007 | He et al. |
| 7,257,379 B2 | 8/2007 | Ozluturk et al. |
| 7,294,106 B2 | 11/2007 | Birkenbach et al. |
| 7,371,218 B2 | 5/2008 | Walston et al. |
| 7,458,935 B2 | 12/2008 | Cerofolini |
| 7,729,742 B2 | 6/2010 | Govari |
| 7,833,159 B2 | 11/2010 | Ahn et al. |
| D629,113 S | 12/2010 | Wodecki |
| 7,867,168 B2 | 1/2011 | Little et al. |
| 7,891,230 B2 | 2/2011 | Randall |
| D639,434 S | 6/2011 | Wodecki et al. |
| 7,984,651 B2 | 7/2011 | Randall et al. |
| 7,987,303 B2 | 7/2011 | Bartlett |
| 8,043,221 B2 | 10/2011 | Marteau et al. |
| 8,066,642 B1 | 11/2011 | Little et al. |
| 8,079,263 B2 | 12/2011 | Randall et al. |
| 8,488,013 B2 | 7/2013 | Jia et al. |
| 8,500,645 B2 | 8/2013 | Cohen et al. |
| 8,535,227 B2 | 9/2013 | Halmann et al. |
| 8,551,000 B2 | 10/2013 | Chiang et al. |
| 8,628,474 B2 | 1/2014 | Chiang et al. |
| 8,717,843 B2 | 5/2014 | Cerofolini |
| 8,852,103 B2 | 10/2014 | Rothberg et al. |
| 9,022,936 B2 | 5/2015 | Rothberg et al. |
| 9,028,412 B2 | 5/2015 | Rothberg et al. |
| 9,033,879 B2 | 5/2015 | Urness et al. |
| 9,033,884 B2 | 5/2015 | Rothberg et al. |
| 9,061,318 B2 | 6/2015 | Rothberg et al. |
| 9,067,779 B1 | 6/2015 | Rothberg et al. |
| 9,149,255 B2 | 10/2015 | Rothberg et al. |
| 9,151,832 B2 | 10/2015 | Little et al. |
| 9,155,521 B2 | 10/2015 | Rothberg et al. |
| 9,198,637 B2 | 12/2015 | Rothberg et al. |
| 9,229,097 B2 | 1/2016 | Rothberg et al. |
| 9,242,275 B2 | 1/2016 | Rothberg et al. |
| 9,247,924 B2 | 2/2016 | Rothberg et al. |
| 9,268,014 B2 | 2/2016 | Rothberg et al. |
| 9,268,015 B2 | 2/2016 | Rothberg et al. |
| 9,290,375 B2 | 3/2016 | Rothberg et al. |
| 9,327,142 B2 | 5/2016 | Rothberg et al. |
| 9,337,901 B2 | 5/2016 | Takahashi |
| 9,339,253 B2 | 5/2016 | Peszynski et al. |
| 9,351,706 B2 | 5/2016 | Rothberg et al. |
| 9,383,435 B2 | 7/2016 | Osawa |
| 9,392,996 B2 | 7/2016 | Chamberlain et al. |
| 9,394,162 B2 | 7/2016 | Rothberg et al. |
| 9,402,601 B1 | 8/2016 | Berger et al. |
| 9,476,969 B2 | 10/2016 | Rothberg et al. |
| 2002/0195910 A1 | 12/2002 | Hus et al. |
| 2003/0078501 A1 | 4/2003 | Barnes et al. |
| 2003/0097071 A1 | 5/2003 | Halmann et al. |
| 2003/0139664 A1 | 7/2003 | Hunt et al. |
| 2003/0139671 A1 | 7/2003 | Walston et al. |
| 2003/0167004 A1 | 9/2003 | Dines et al. |
| 2003/0181811 A1 | 9/2003 | Amemiya et al. |
| 2004/0015079 A1 | 1/2004 | Berger et al. |
| 2004/0225220 A1 | 11/2004 | Rich |
| 2006/0010296 A1 * | 1/2006 | Dent ....................... A63F 13/08 711/147 |
| 2006/0058655 A1 | 3/2006 | Little |
| 2006/0072799 A1 | 4/2006 | McLain |
| 2007/0242567 A1 | 10/2007 | Daft et al. |
| 2008/0114248 A1 | 5/2008 | Urbano et al. |
| 2008/0137482 A1 | 6/2008 | Kang et al. |
| 2008/0208061 A1 | 8/2008 | Halmann |
| 2008/0262347 A1 | 10/2008 | Batchelder et al. |
| 2009/0177086 A1 | 7/2009 | Steen |
| 2010/0022822 A1 | 1/2010 | Walshe et al. |
| 2010/0022882 A1 | 1/2010 | Duckworth et al. |
| 2010/0056956 A1 | 3/2010 | Dufresne et al. |
| 2010/0160786 A1 | 6/2010 | Nordgren et al. |
| 2010/0168576 A1 | 7/2010 | Poland et al. |
| 2010/0277305 A1 | 11/2010 | Garner et al. |
| 2010/0280419 A1 | 11/2010 | Donskoy et al. |
| 2010/0305449 A1 * | 12/2010 | Wegener ................ A61B 8/483 600/459 |
| 2011/0071397 A1 | 3/2011 | Wodnicki et al. |
| 2011/0245670 A1 | 10/2011 | Tashiro et al. |
| 2011/0286630 A1 | 11/2011 | Harder et al. |
| 2012/0022379 A1 | 1/2012 | Gubbini et al. |
| 2012/0108975 A1 | 5/2012 | Marteau et al. |
| 2012/0265027 A1 | 10/2012 | Lee et al. |
| 2012/0289836 A1 | 11/2012 | Ukimura et al. |
| 2013/0165796 A1 | 6/2013 | Tashiro |
| 2013/0184587 A1 | 7/2013 | Eom et al. |
| 2013/0226001 A1 | 8/2013 | Steen et al. |
| 2013/0261463 A1 | 10/2013 | Chiang et al. |
| 2013/0345566 A1 | 12/2013 | Weitzel et al. |
| 2014/0005547 A1 | 1/2014 | Balasubramanian |
| 2014/0024942 A1 | 1/2014 | Halmann et al. |
| 2014/0028479 A1 * | 1/2014 | Cheung .................. H03M 7/02 341/87 |
| 2014/0051984 A1 | 2/2014 | Berger et al. |
| 2014/0114190 A1 | 4/2014 | Chiang et al. |
| 2014/0121524 A1 | 5/2014 | Chiang et al. |
| 2014/0180097 A1 | 6/2014 | Rothberg et al. |
| 2014/0180100 A1 | 6/2014 | Rothberg et al. |
| 2014/0243614 A1 | 8/2014 | Rothberg et al. |
| 2014/0243669 A1 | 8/2014 | Halmann et al. |
| 2014/0275851 A1 | 9/2014 | Amble et al. |
| 2014/0288428 A1 | 9/2014 | Rothberg et al. |
| 2014/0300720 A1 | 10/2014 | Rothberg et al. |
| 2014/0357993 A1 | 12/2014 | Hiriyannaiah et al. |
| 2015/0032002 A1 | 1/2015 | Rothberg et al. |
| 2015/0038844 A1 | 2/2015 | Blalock et al. |
| 2015/0067441 A1 * | 3/2015 | Gorissen ................ G06F 7/544 714/759 |
| 2015/0087987 A1 | 3/2015 | Ryu et al. |
| 2015/0092838 A1 | 4/2015 | Hiriyannaiah et al. |
| 2015/0164477 A1 | 6/2015 | Ryu et al. |
| 2015/0245823 A1 | 9/2015 | Jin et al. |
| 2015/0247921 A1 | 9/2015 | Rothberg et al. |
| 2015/0250454 A1 | 9/2015 | Lee |
| 2015/0297192 A1 | 10/2015 | Chamberlain et al. |
| 2015/0297193 A1 | 10/2015 | Rothberg et al. |
| 2015/0325036 A1 | 11/2015 | Lee |
| 2015/0326872 A1 | 11/2015 | Lee et al. |
| 2015/0366538 A1 | 12/2015 | McKenna |
| 2016/0007957 A1 | 1/2016 | Murphy et al. |
| 2016/0009544 A1 | 1/2016 | Rothberg et al. |

(56) References Cited

U.S. PATENT DOCUMENTS

| | | |
|---|---|---|
| 2016/0015368 A1 | 1/2016 | Poland |
| 2016/0069989 A1 | 3/2016 | Rothberg et al. |
| 2016/0100824 A1 | 4/2016 | Kim |
| 2016/0120507 A1 | 5/2016 | Ninomiya et al. |
| 2016/0125641 A1 | 5/2016 | Lee et al. |
| 2016/0131748 A1 | 5/2016 | Little et al. |
| 2016/0151045 A1 | 6/2016 | Pelissier et al. |
| 2016/0199036 A1 | 7/2016 | Pelissier et al. |
| 2016/0202349 A1 | 7/2016 | Rothberg et al. |
| 2016/0207760 A1 | 7/2016 | Rothberg et al. |
| 2016/0228091 A1 | 8/2016 | Chiang et al. |
| 2016/0228092 A1 | 8/2016 | Kim et al. |
| 2016/0280538 A1 | 9/2016 | Rothberg et al. |
| 2016/0290969 A1 | 10/2016 | Rothberg et al. |
| 2016/0290970 A1 | 10/2016 | Rothberg et al. |
| 2016/0338676 A1 | 11/2016 | Berger et al. |
| 2016/0345936 A1* | 12/2016 | Cho .............. G01S 7/52068 |
| 2017/0000457 A1 | 1/2017 | Chamberlain et al. |
| 2017/0029271 A1 | 2/2017 | Rothberg et al. |
| 2017/0067988 A1 | 3/2017 | Rothberg et al. |
| 2017/0143313 A1* | 5/2017 | Pelissier .............. A61B 8/565 |
| 2017/0238907 A1* | 8/2017 | Kommu CHS ........ A61B 8/483 |

FOREIGN PATENT DOCUMENTS

| | | |
|---|---|---|
| EP | 2135110 A2 | 12/2009 |
| EP | 2863805 A1 | 4/2015 |
| JP | S5215372 A | 2/1977 |
| JP | 2002530142 A | 9/2002 |
| JP | 2003033350 A | 2/2003 |
| JP | 2012120691 A | 6/2012 |
| JP | 2013158589 A | 8/2013 |
| WO | WO-9701768 A2 | 1/1997 |
| WO | WO-0030540 A1 | 6/2000 |
| WO | WO-0066001 A1 | 11/2000 |
| WO | WO-0079300 A1 | 12/2000 |
| WO | WO-03069761 A1 | 8/2003 |
| WO | WO-2008124841 A2 | 10/2008 |
| WO | WO-2008146201 A2 | 12/2008 |
| WO | WO-2009135255 A1 | 11/2009 |
| WO | WO-2013148730 A2 | 10/2013 |
| WO | WO-2013162244 A1 | 10/2013 |
| WO | WO-2014003404 A1 | 1/2014 |
| WO | WO-2014123922 A1 | 8/2014 |
| WO | WO-2014134175 A2 | 9/2014 |
| WO | WO-2014151362 A2 | 9/2014 |
| WO | WO-2014151525 A2 | 9/2014 |
| WO | WO-2014165662 A2 | 10/2014 |
| WO | WO-2015013245 A2 | 1/2015 |
| WO | WO-2015048327 A2 | 4/2015 |
| WO | WO-2015161147 A1 | 10/2015 |
| WO | WO-2015161157 A1 | 10/2015 |
| WO | WO-2015161164 A1 | 10/2015 |
| WO | WO-2015161292 A1 | 10/2015 |
| WO | WO-2016011000 A1 | 1/2016 |
| WO | WO-2016057622 A1 | 4/2016 |
| WO | WO-2016057631 A1 | 4/2016 |

OTHER PUBLICATIONS

Ahn, et al. Smartphone-based portable ultrasound imaging system: Prototype implementation and evaluation. Conference: Oct. 2015 IEEE International Ultrasonics Symposium (IUS). DOI: 10.1109/ULTSYM.2015.0517.

Almekkawy, et al. An optimized ultrasound digital beamformer with dynamic focusing implemented on FPGA. Conf Proc IEEE Eng Med Biol Soc. 2014;2014:3296-9. doi: 10.1109/EMBC.2014.6944327.

Daft, et al. Matrix Transducer Design with Improved Image Quality and Acquisition Rate. Conference: Ultrasonics Symposium, Nov. 2007, IEEE. DOI: 10.1109/ULTSYM.2007.112.

Fuller, et al. Real time imaging with the Sonic Window: A pocket-sized, C-scan, medical ultrasound device. Conference: Ultrasonics Symposium (IUS), Oct. 2009 IEEE International. DOI: 10.1109/ULTSYM.2009.5441943.

Hewener, et al. Mobile ultrafast ultrasound imaging system based on smartphone and tablet devices. Ultrasonics Symposium (IUS), Oct. 2015 IEEE International.

Hoegh, et al. Ultrasonic Tomography for Evaluation of Concrete Pavements. Transportation Research Record: Journal of the Transportation Research Board. 2011. vol. 2232. DOI: 10.3141/2232-09.

Hwang, et al. Portable ultrasound device for battlefield trauma. Conference: Ultrasonics Symposium, 1998. Proceedings, Feb. 1998 IEEE, vol. 2. DOI: 10.1109/ULTSYM.1998.765266.

Kim, et al. A new nonlinear zone-based beamforming method for point-of-care ultrasound: Algorithms and implementation. 2014 IEEE International Ultrasonics Symposium pp. 2137-2140.

Kim, et al. A single FPGA-based portable ultrasound imaging system for point-of-care applications. IEEE Trans Ultrason Ferroelectr Freq Control. Jul. 2012;59(7):1386-94. doi: 10.1109/TUFFC.2012.2339.

Nippon Pulse America, Inc. S040 Linear Shaft Motor for Small-Scale High Precision. Web article. Aug. 9, 2011. URL:<http://www.nipponpulse.com/news/view/s040-linear-shaft-motor-for-small-scale-high-precision>.

Ruiter, et al. First results of a clinical study with 3D ultrasound computer tomography. Ultrasonics Symposium (IUS), 2013 IEEE International.

Yang, et al. A Comparison of the Lookup Table and On-The-Fly Calculation Methods for the Beamforming Control Unit. ITC-CSCC : 2008, Jul. 2008, 657-660 (4 pages).

* cited by examiner

DYNAMIC RANGE COMPRESSION OF ULTRASOUND IMAGES

BACKGROUND

Prior methods and apparatus to compress data such as ultrasound image data can be less than ideal in at least some respects. For example, compression of image data with formats such as JPEG and MPEG can result in decreased image quality in at least some instances. Also, prior methods and apparatus for compressing data can result in greater amounts of circuitry and power consumption than would be ideal. For example, prior approaches to compressing data with lookup tables can result in greater amounts of memory being used, increased power consumption, and may have longer latency periods than would be ideal.

In light of the above, improved methods and apparatus for compressing data such as ultrasound data would be helpful. Ideally, such improved methods and apparatus would provide increased throughput, decreased power consumption, decreased latency, and decreased degradation of images.

SUMMARY

The present methods and apparatus provide improved high-resolution ultrasound images with data compression, such as ultrasound images from an imaging probe (e.g., a handheld imaging probe). Data such as pixel data can be compressed on the handheld (or "hand held") imaging probe prior to transmission by dynamic range compression (e.g., from a first dynamic range to a second dynamic range less than the first dynamic range) in order to decrease the amount of data transmitted from the probe and/or to prepare image data suitable for display. The dynamic range compressed data can be generated quickly and in accordance with clock cycles of a processor in order to decrease latency between receiving uncompressed pixels and generating compressed pixels. The dynamic range compression circuitry may comprise an amount of memory related to a dynamic range of the compressed data that is independent of the dynamic range of the input data, which can decrease memory, decrease power consumption, and decrease latencies of image transmission. The dynamic range compression circuitry can be configured to pipeline data such as image data in accordance with clock cycles, such that throughput between inputting data words and outputting data words is increased. A dynamic range compressed image may comprise the same number of pixels as an uncompressed image in order to maintain spatial resolution. The compression may be performed in accordance with a lookup table in order to increase throughput of generating dynamic range compressed data, thereby decreasing degradation of the compressed data.

In a first aspect, a handheld ultrasound probe for generating a plurality of pixels of a plurality of ultrasound images comprises an ultrasound transducer array and an analog-to-digital (A/D) converter. The A/D converter is coupled to the ultrasound transducer array to acquire ultrasound data. A processor is coupled to the A/D converter and configured with instructions that, when executed, cause the processor to generate a plurality of uncompressed pixels of the plurality of ultrasound images and generate the plurality of compressed pixels from the uncompressed pixels of the plurality of ultrasound images.

In another aspect, a method for generating pixels of a plurality of ultrasound images with handheld ultrasound probe comprises generating a plurality of uncompressed pixels of the plurality of ultrasound images with a processor coupled to an A/D converter. A plurality of compressed pixels is generated from the plurality of uncompressed pixels.

In another aspect, an apparatus for compressing input words of m bits to output words of n bits, wherein n<m, comprises a plurality of n memory components and a logic circuit. Each memory component is configured to store a respective sub-table of a lookup table. The lookup table comprises a plurality of ordered threshold values, the threshold values corresponding to a domain of a monotonic function and respective indices of the threshold values as ordered corresponding to a range of the monotonic function. The logic circuit comprises operations for: determining, in a plurality of n stages respectively corresponding to the plurality of n sub-tables, based on an input word and the plurality of n sub-tables, a plurality of n bits of an output word. The logic circuitry comprises operation for concatenating the plurality of n bits to generate the output word.

In another aspect, a logic circuit is configured for compressing input words of m bits to output words of n bits, wherein n<m. The logic circuit comprises operations for determining a plurality of n bits of an output word, in a plurality of n pipeline stages respectively corresponding to a plurality of n sub-tables of a lookup table. The lookup table comprises a plurality of $(2^n)-1$ ordered threshold values, and each $i^{th}$ sub-table of the n sub-tables comprises $2^{(i-1)}$ threshold values. The threshold values correspond to a domain of a monotonic function, and respective indices of the threshold values as ordered correspond to a range of the monotonic function. The plurality of n bits is concatenated to generate the output word, wherein each stage generates one bit of the output word. A latency of the logic circuit is at most n clock cycles and a throughput of the logic circuit is at least one output word per cycle.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

DETAILED DESCRIPTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Figure 1:
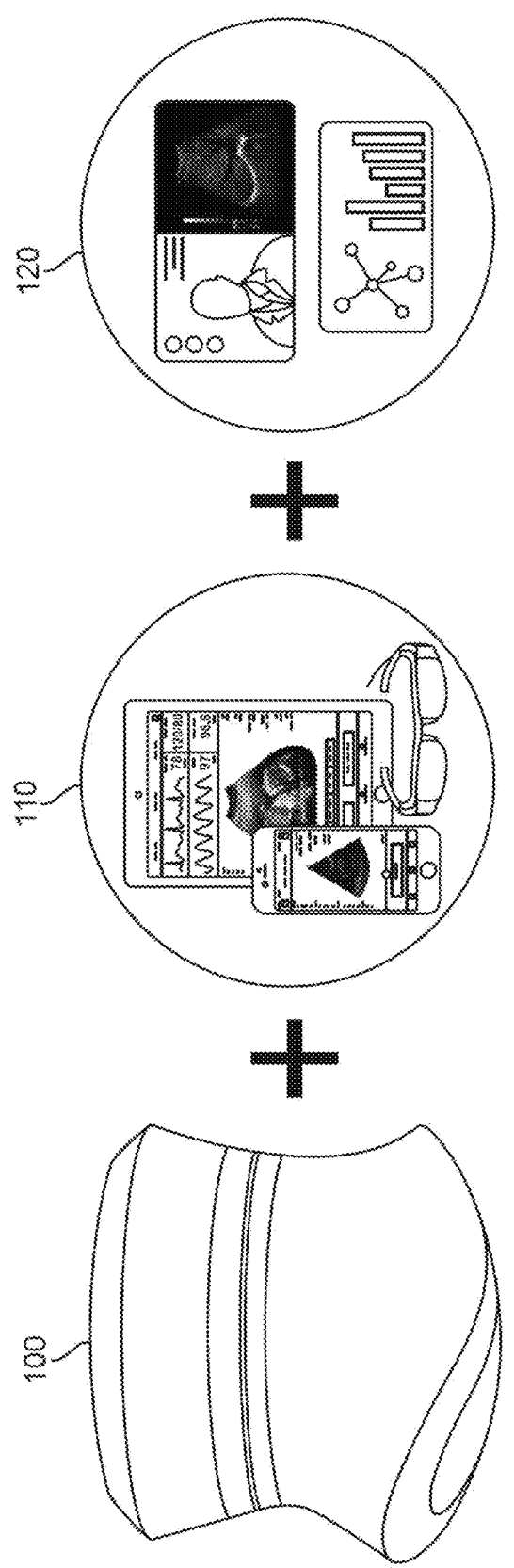
FIG. 1 illustrates a schematic of a portable ultrasound system capable of communicating with an external device.

FIG. 1 illustrates a schematic of a portable ultrasound system capable of communicating with an external device. The portable ultrasound device 100 may comprise one or more transducer arrays (each comprising one or more ultrasonic transducers), one or more ultrasound beamforming components, one or more electronic devices to control the beamforming components, one or more batteries or external power modules, and one or more wireless transceivers.

The systems and methods described herein may allow reduced memory, computational, and communication processing requirements while maintaining high-quality ultrasound imaging capabilities. In particular, the systems and methods may allow a plurality of ultrasound images to be compressed, thereby yielding one or more advantages, such as (i) a reduction in memory requirements, (ii) a reduction in the amount of data transferred from the portable ultrasonic device to the display (e.g., over a wireless communication), and (iii) an increased sensitivity of low-intensity signals made possible by compression with a non-linear function.

The portable ultrasound device may communicate the results of an ultrasound measurement via a wireless communication channel to a portable electronic device 110, (such as a tablet, smartphone, smartwatch, smartglasses, or other portable electronic device), a desktop monitor or laptop display (e.g., a liquid crystal display (LCD)), or a television (e.g., a flat panel TV or a smart TV). The wireless communication may be via Bluetooth communication or other short distance wireless communication. The wireless communication may be via Wi-Fi communication. The wireless communication may be via any other wireless communication known to one having skill in the art.

The results may be fully processed ultrasound images. All processing of the ultrasound image may be performed on the portable ultrasound device. For instance, the portable ultrasound device may include hardware or software elements that allow ultrasound signals to be converted into electronic representations. The portable ultrasound device may further include hardware or software elements that allow processing of the electronic representations to extract, for instance, an ultrasound image.

The portable electronic device may display results and analysis of the ultrasound measurement on one or more mobile applications 120. Alternatively or in combination, the portable electronic device may display results and analysis of the ultrasound measurement on one or more desktop monitor, laptop displays, or television displays. The one or more mobile applications may comprise an environment that displays the ultrasound image. The one or more mobile applications may comprise an environment that allows sharing of the ultrasound image with a specialist, such as a radiologist or ultrasound technician. The specialist may interpret the results of the ultrasound image to provide clinical advice, such as a diagnosis, based on the results of the ultrasound image. In this manner, the portable ultrasound system may be used by a patient or by a health care provider even in facilities lacking access to specialists capable of interpreting ultrasound results. The one or more applications may allow sharing of ultrasound images with a specialist in near real time. This capability may allow the specialist to provide instructions to the user on how to operate the portable ultrasound device. For instance, the near real-time image sharing capability may allow the specialist to direct a patient or health care provider to move the portable ultrasound device to a different location on the patient's body. The real-time image sharing capability may provide near real-time feedback on whether the portable ultrasound is properly positioned to obtain ultrasound images of a desired location within the patient's body. In this manner, the portable ultrasound system may be used even by a patient or health care provider who has little or no experience in the use of ultrasound systems.

Figure 2:
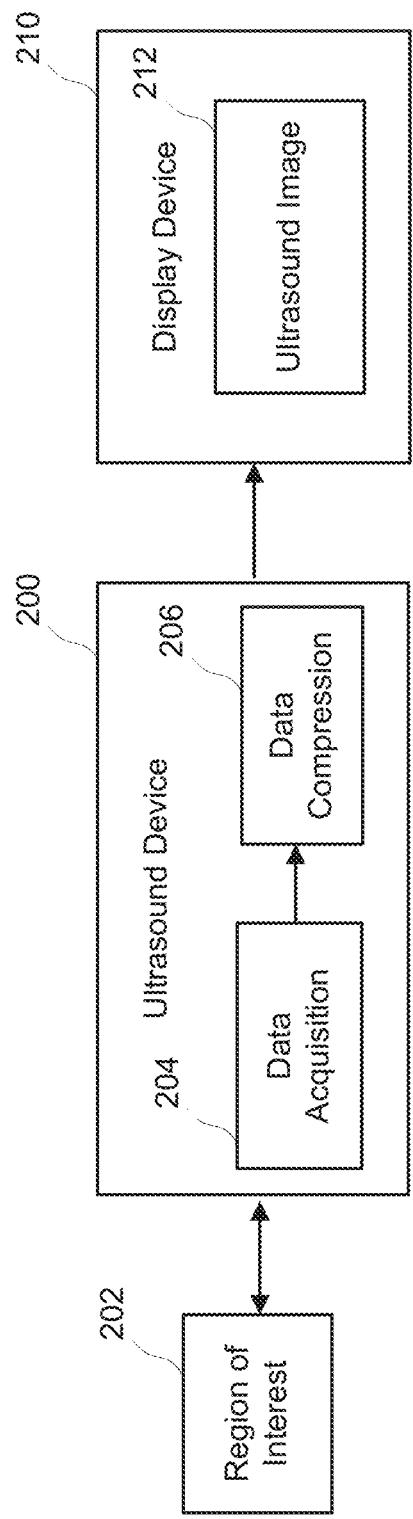
FIG. 2 illustrates a block diagram of an ultrasound imaging device used to image a region of interest.

FIG. 2 illustrates a block diagram of an ultrasound imaging device used to image a region of interest. An ultrasound device 200 sends ultrasonic energy, such as in the form of ultrasonic waves, to a medium based on a particular region of interest 202, and receives reflected ultrasonic waves from the region of interest. The region of interest may comprise a space that is being imaged. The region of interest may include any one or more objects. The region of interest may comprise a region inside of a patient's body. In some cases, the region of interest may comprise a fetus in a womb. In some instances, the region of interest may comprise an internal organ of the patient, such as a heart, lung, kidney, bladder, or any other organ. The region of interest may comprise a portion of an organ. The region of interest may comprise more than one organ. In some cases, the region of interest may comprise multiple objects clustered in the same vicinity. For example, the region of interest may include a cluster of objects such as multiple bladder stones in a bladder. In some cases, the region of interest may represent multiple portions or landmarks of an organ, such as multiple components of a heart. For example, such portions or landmarks of a heart may include a right ventricle, a left ventricle, a right atrium, a left atrium, and a thoracic aorta. The systems and methods described herein may be applied to imaging of regions that include multiple objects.

As described in more detail below, the ultrasound device 200 processes the reflected ultrasonic waves and sends processed image data to a display device 210. The ultrasound device 200 is configured to process data as described herein. The ultrasound device comprises data acquisition circuitry 204, and data compression circuitry 206 to compress data received from the data acquisition circuitry.

The display device displays an ultrasound image 212 based on the processed image data received from the ultrasound device. In some cases, the ultrasound image shows one or more objects located in a particular space that reflect ultrasonic waves emitted by the ultrasound device back to the ultrasound device. The display device may be located at a position near to the ultrasound device, such as in the same room as the ultrasound device. The display device may be located at a position remote from the ultrasound device. For instance, the ultrasound device may be located at a physician's office while the display device is located at a hospital or the office of a specialist who is able to interpret ultrasound images. The display device may be configured to communicate with an image reproduction device such as a digital display, a printer, a wearable device, an augmented-reality device, a virtual-reality device, a 3-dimensional (3D) display, etc.

Although reference is made to circuitry to acquire and compress ultrasound data, the data acquisition and data compression circuitry as described herein can be configured in many ways to process and compress many types of data, and the type of data acquired and compressed is not limited to ultrasound data. Further the data acquisition and compression circuitry as described herein can be located off of a hand held probe. Data acquisition circuitry 204 can be configured to acquire data from any data source, such as a video signal, an audio signal, an ultrasound or other medical imaging signal, a sound wave, an electrical signal, or another type of analog or digital signal, for example. Data compression circuitry 206 can be configured to compress the acquired data with any type of data compression method such as image compression or pixel compression as described herein, for example. Alternatively or in combination, data compression circuitry 206 can be configured to compresses analog or digital data and may produce analog or digital compressed data. Image compression may be performed by a lossless or lossy compression method (e.g. JPEG, GIF). Pixel compression may be performed by reducing the number of bits representing a pixel, such as dynamic range reduction using a lookup table (e.g., using a compression function), bit truncation (e.g., removing one or more most significant bits or least significant bits), or averaging adjacent pixel values. The data compression circuitry 206 may be configured to downsample images (e.g., removing a portion of images from the data to reduce frame rate) or pixels (e.g., removing a portion of pixels from the data to reduce spatial resolution of images).

Figure 3:
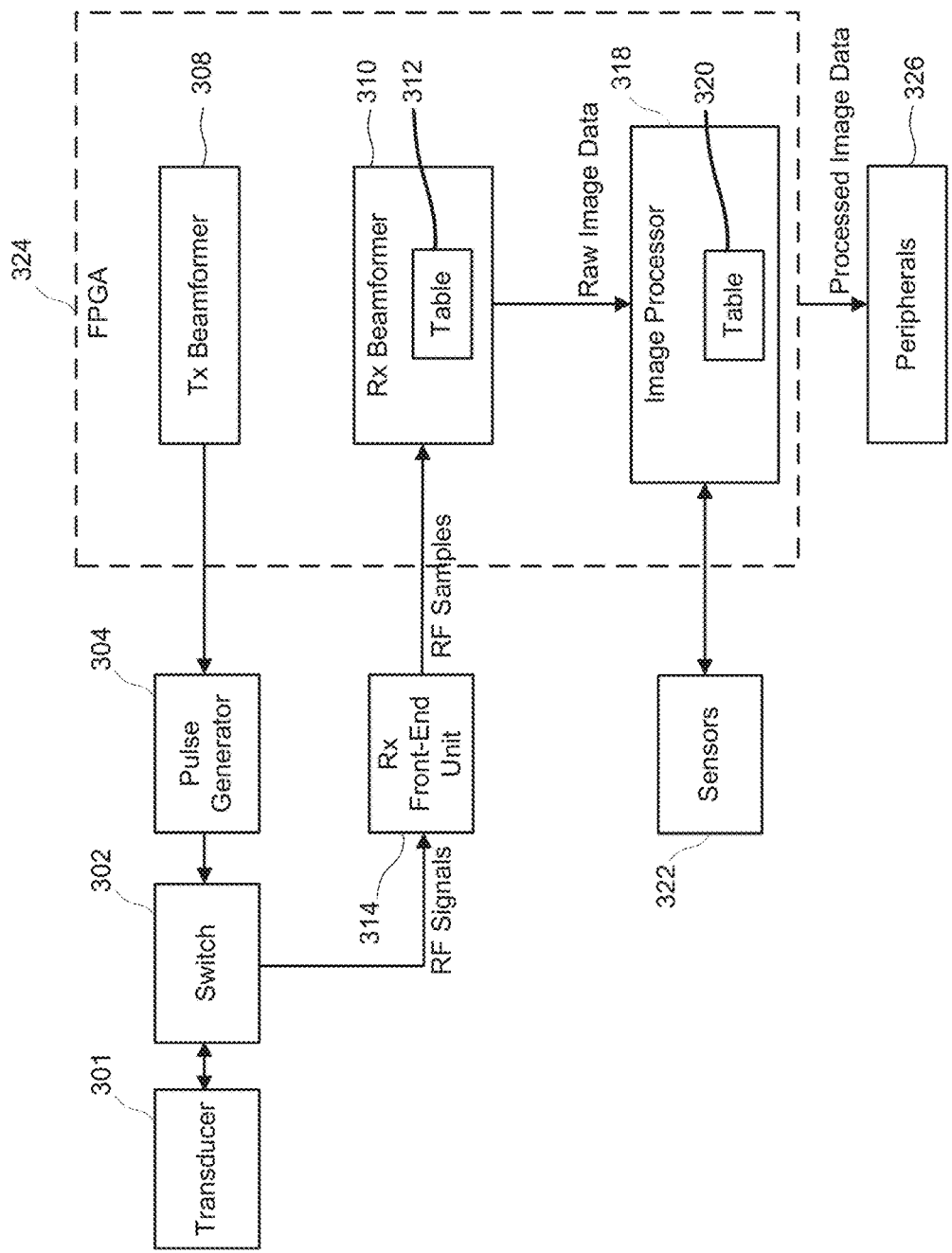
FIG. 3 illustrates a block diagram of an example ultrasound imaging device.

FIG. 3 illustrates a block diagram of an example ultrasound device 200, which may be used for some implementations described herein. For example, ultrasound device 200 may be used to implement ultrasound device 100 of FIG. 1. In some implementations, ultrasound device 200 includes a transducer array 301, a switch 302, and a pulse generator 304. Transducer array 301 may also be referred to as transducer 301. Ultrasound device 200 may include a transmit (Tx) beamformer 308 and/or a receive (Rx) beamformer 310. Rx beamformer 310 may include a memory that stores a table 312. Ultrasound device 200 may include an Rx front-end unit 314 and/or an image processor 318. In some implementations, ultrasound device 200 also includes sensors 322 and/or peripherals 326.

In some implementations, a table 312 may be stored on FPGA 324, or stored on any other suitable storage device. Furthermore, in various implementations, FPGA 324 may not have all of the components shown and/or may have other elements including other types of elements instead of, or in addition to, those shown herein. For example, in some implementations, FPGA 324 may include image processor 318. Furthermore, while image processor 318 is described herein as performing separate functions, in some implementations, a single processing unit such as FPGA 324 may perform all of the functions and implementations described herein.

For ease of illustration, FIG. 3 shows one block for each of components of ultrasound device 200. In other implementations, ultrasound device 200 may not have all of the components shown and/or may have other elements including other types of elements instead of, or in addition to, those shown herein.

In operation, Tx beamformer 308 causes pulse generator 304 to generate electrical signals based on transmit beamforming, where the electrical signals are applied to transducer array (or "transducer") 301. The electrical signals or pulses may be produced at a predetermined pulse rate (e.g., 1,000 pulses per second, etc.), depending on the particular implementation. The switch 302 may select one of two operating modes: (1) select the signal in the direction from the pulse generator 304 to the transducer 301 or (2) select the signal in the direction from the transducer 301 to the Rx front-end unit 314.

In various implementations, pulse generator 304 controls the amplitude of the electrical signals or pulses, which in turn controls the intensity and energy of an ultrasound beam produced by transducer array 301, after the signal is selected in the direction from the pulse generator 304 to the transducer array 301 by the switch 302. Pulse generator 304 may also control the width of the pulses (which in turn controls the signal frequency) and the number of cycles in the pulses (which in turn controls the energy and the bandwidth of the signal).

Transducer array 301 may generate ultrasonic waves based on the electrical signals received from pulse generator 304. The ultrasonic waves may also be referred to as ultrasound waves, ultrasonic pulses, or ultrasound pulses.

In various implementations, transducer array 301, also referred to as a transducer or probe, is positioned in direct contact with a surface such as the body of a patient (e.g., the abdomen of a patient). In some implementations, the probe need not be in direct contact with the surface. For example, there may be water or another medium between the probe and the surface. In some implementations, when the probe is in direct contact with the surface, an ultrasound gel may be used to couple the probe with the surface. Transducer array 301 may focus a beam of ultrasonic waves or pulses to give the beam a particular size and shape at various depths within a particular space/area beneath the surface (e.g., a portion of patient's body). Transducer array 301 may also scan the beam over the space that is being imaged (e.g., over an anatomical area). The space that is being imaged may also be referred to as a region of interest.

In various implementations, transducer array 301 includes one or more transducer elements. In various implementations, the particular type of transducer elements may vary, depending on the particular implementation. For example, the transducer elements may be piezoelectric transducer elements, capacitive transducer elements, etc. When an electrical pulse is applied to a given transducer element, the transducer element vibrates and produces the ultrasound, or ultrasonic wave, which is directed at the region of interest. Conversely, when a given transducer element is vibrated by returning ultrasound echoes from objects in the region of interest, the transducer element produces radio frequency (RF) signals.

When transducer array 301 receives reflected ultrasonic waves (e.g., from objects in the region of interest), transducer array 301 may generate RF signals based on the reflected ultrasonic waves. The reflected ultrasonic waves may also be referred to as ultrasonic echoes, or ultrasound echoes, or echoes. The RF signals may also be referred to as raw RF data.

In some implementations, Rx front-end unit 314 amplifies and digitizes the RF signals from transducer array 301 (after the signal is selected in the direction from the transducer 301 to the Rx front-end unit 314 by the switch 302) to provide RF samples, and sends the RF samples to Rx beamformer 310. The RF samples may also be referred to as digitized RF signals. In some implementations, Rx front-end unit 314 amplifies and/or filters the RF signals before digitizing them. In some implementations, the amplifier gain of Rx front-end unit 314 may vary over time, in order to compensate for ultrasound attenuation.

In various implementations, Rx beamformer 310 generates raw image data based on the RF samples and performs beamforming functions in order to generate the raw image data. In some implementations, Rx beamformer 310 creates an intensity map of the reflected ultrasonic waves corresponding to every point in the field of view of region of interest 202. Rx beamformer 310 may map the received (e.g., time-domain) signal to a location in an image and coherently sums the signals from all transducer elements for every point in the field of view.

In various implementations, Rx beamformer 310 determines which of the RF samples are to be used to generate raw image data based on table 312. As described in more detail herein, in various implementations, table 312 indicates which RF samples are to be used to generate raw image data and which RF samples are not to be used to generate raw image data.

In various implementations, table 312 is predetermined in that information in table 312 is generated prior to an imaging session, and table 312 is pre-loaded in Rx beamformer 310 or in any other suitable storage location. Table 312 may also be referred to as predetermined table 312. During runtime, Rx beamformer 310 checks table 312 during an imaging session in order to determine which RF samples to use to generate raw image data. In various implementations, Rx beamformer 310 generates raw image data based on the RF samples that are to be used to generate raw image data, and then sends the raw image data to image processor 318.

As indicated herein, image processor 318 processes the raw image data to provide the processed image data. The processed image data may be referred to as post-processed image data. The processed image data may in turn be used to provide ultrasound images.

As described in more detail herein, in various implementations, image processor 318 may determine input values based on the raw image data from Rx beamformer 310. Image processor 318 may determine output values based on the input values and a table 320 (e.g., by using a compression circuitry). In various implementations, image processor 318 compresses the raw image data such that the dynamic range of the processed image data is smaller than the dynamic range of the raw image data.

In various implementations, table 320 is predetermined in that information in table 320 is generated prior to an imaging session, and table 320 is pre-loaded in image processor 318 or in any other suitable storage location. Table 320 may also be referred to as predetermined table 320. During runtime, image processor 318 may check table 320 during an imaging session in order to determine the output values used to generate processed image data. Various implementations of table 320 are described in more detail herein.

In various implementations, sensors 322 may include position sensors, rotational sensors, tilt sensors, gyroscopes, accelerometers, etc., for positioning ultrasound device 200. In some implementations, the position sensors and rotational sensors may be integrated.

In various implementations, peripherals 326 may include one or more display devices and/or may send processed image data to remote display devices (e.g., a 2D display, a 3D display, a printer, a wearable device, an augmented-reality glass, a virtual-reality glass, etc.). Remote display devices may include stand-alone computers, tablet computers, smartphones, dedicated monitors, etc. In some implementations, peripherals 326 may also include an electrocardiograph (ECG or EKG device), pulse oximeter, position tracker, needle guide, etc.

Image processor 318 may perform various operations to generate processed image data, e.g., image compression. This generation may be based on raw image data received from Rx beamformer 310 in order to provide ultrasound images. In various implementations, to process the raw image data to provide processed image data, image processor 318 compresses the raw image data such that the dynamic range of the processed image data is smaller than the dynamic range of the raw image data.

An image compression method is initiated when image processor 318 determines input values based on raw image data from Rx beamformer 310, where the input values fall within a dynamic range of input values (e.g., $[0, (2^{32}-1)]$ for a 32-bit input). In some implementations, the dynamic range of input values includes dynamic subranges. In some implementations, the dynamic range of input values may have a predetermined number of dynamic subranges (e.g., 2, 4, 8, 16, 32, 64, 128, 256, 512, etc.). The dynamic subranges may be a set of intervals (e.g., unequally spaced, equally spaced, or approximately equally spaced) such that the predetermined number of dynamic subranges span the dynamic range of input values (e.g., $[0, (2^{31}-1)]$ and $[2^{31}, (2^{32}-1)]$ for a 32-bit input and 2 dynamic subranges).

The image processor 318 may determine output values based on the dynamic subranges in which the input values fall. As described in more detail herein, in some implementations, there may be 256 dynamic subranges into which one or more input values may fall. Depending on the selection of compression function, a given dynamic subrange may contain no input values. Each output value is one of 256 output values (e.g., integers from 0 to 255), where each output value corresponds to one of the 256 dynamic subranges.

For example, if there are 32 input bits and 8 output bits, an example compression function may be $f(x)=8\log_2(x+1)-1$. This will map an input value of $2^{32}-1$ ($FFFFFFFF_{16}$) to an output value of 255. Setting the output value to 1 and solving for x, we observe that the first threshold value for such a compression function may be 1 (e.g., 0.19 rounded up to the nearest integer value). The second threshold value may be calculated by setting the output value to 2 and solving for x, and so on to generate the entire set of threshold values. Each dynamic subrange may be defined by a range of integers between two successive threshold values. Examples of dynamic subranges and output values are listed in Table 1 below.

TABLE 1

| | | | | | |
|---|---|---|---|---|---|
| Dynamic Subrange (Lower Bound) | 0 (00000000₁₆) | 14 | 234 | 60,096 | 3,938,502,375 |
| Dynamic Subrange (Upper Bound) | 1 (00000001₁₆) | $2^4 - 1$ (15) (0000000F₁₆) | $2^8 - 1$ (255) (000000FF₁₆) | $2^{16} - 1$ (65,535) (0000FFFF₁₆) | $2^{32} - 1$ (4,294,967,295) (FFFFFFFF₁₆) |
| Output Value | 1 | 31 | 63 | 127 | 255 |

As such, the overall dynamic range of input values is compressed or reduced to a smaller dynamic range of output values. One benefit of a smaller dynamic range of output values is that the number of bits representing input values is reduced to a smaller number of bits representing output values, thereby compressing the data and reducing the memory requirements. Various implementations directed to image processor 318 determining output values are described in more detail herein.

As described in more detail herein, image processor 318 provides the processed image data, which may be high-quality image data, yet with a decreased dynamic range. Image processor 318 may then send the processed image data to a display device to display an ultrasound image to a user.

The image processor 318 may generate the processed image data based on the output values. The processed image data may be the output values (e.g., pixel data). The processed image data may be generated based on the output values (e.g., by contrast enhancement or other image processing techniques prior to displaying the image data). Various implementations directed to image processor 318 generating the processed image data based on the output values are described in more detail herein.

Figure 4:
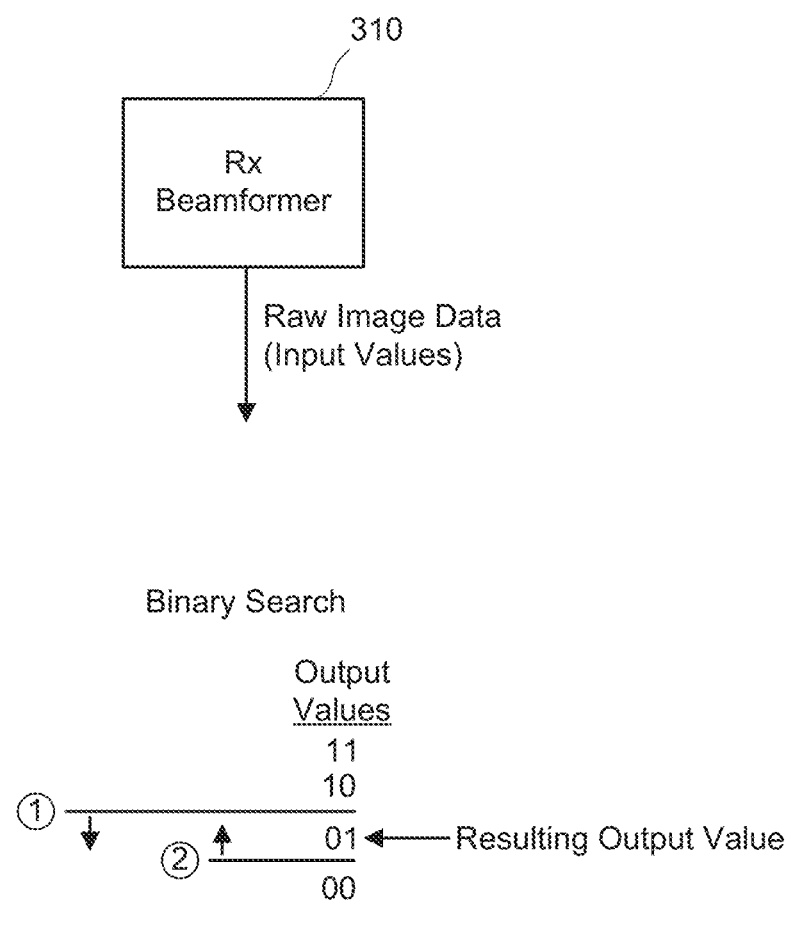
FIG. 4 illustrates an example block diagram for performing a binary search.

FIG. 4 illustrates an example block diagram for performing a binary search, according to some implementations. As shown, Rx beamformer 310 provides raw image data, which includes input values, to image processor 318.

In various implementations, to generate processed image data, image processor 318 performs a binary search, where the binary search identifies a dynamic subrange for each input value, and maps the input values to the output values based on the dynamic subranges. In other words, in various implementations, multiple input values map to a single dynamic subrange, and each dynamic subrange maps to a single output value. As such, one or more of the input values are associated with a single output value. Stated differently, each output value is associated with one or more input values (or in some cases, possibly no input values).

In some implementations, image processor 318 takes each input number and compares each to different subdynamic range thresholds in order to determine in which subdynamic range each input number falls, where each dynamic subrange maps to a particular output value.

Referring still to FIG. 4, for each input value, image processor 318 compares the input value to a first threshold value at a first stage (indicated with a circled '1' in FIG. 4). In this particular simplified example, the possible output values are 00, 01, 10, and 11. In this example, the input value is less than the first threshold value, which narrows the possible output values to 00 and 01. Image processor 318 then compares the input value to a second threshold value at a second stage. In this example, the input value is greater than the second threshold value, which narrows the possible output values to 01. As such, the resulting output value is 01. The threshold values may be calculated as described elsewhere herein.

In this simplified example, the output values are 2-bit values. As such, there are 2 stages where each input value is compared against 2 threshold values. The particular number of bits may vary, depending on the particular implementations. For example, there may be 8-bit output values, in which case there could be 8 stages where each input value is compared against 8 threshold values. In some implementations, the number of output values is limited to 256 output values (e.g., 0 to 255).

In various implementations, the compression function being implemented is such that the output values monotonically increase relative to the input values. In other words, a range of smaller input values corresponds to a smaller output value, and a range of larger input values corresponds to a larger output value. In some implementations, the output values may monotonically decrease relative to the input values. The monotonicity of the compression function may enable a recursive binary search method to be performed with a lookup table, as described elsewhere herein.

Figure 5:
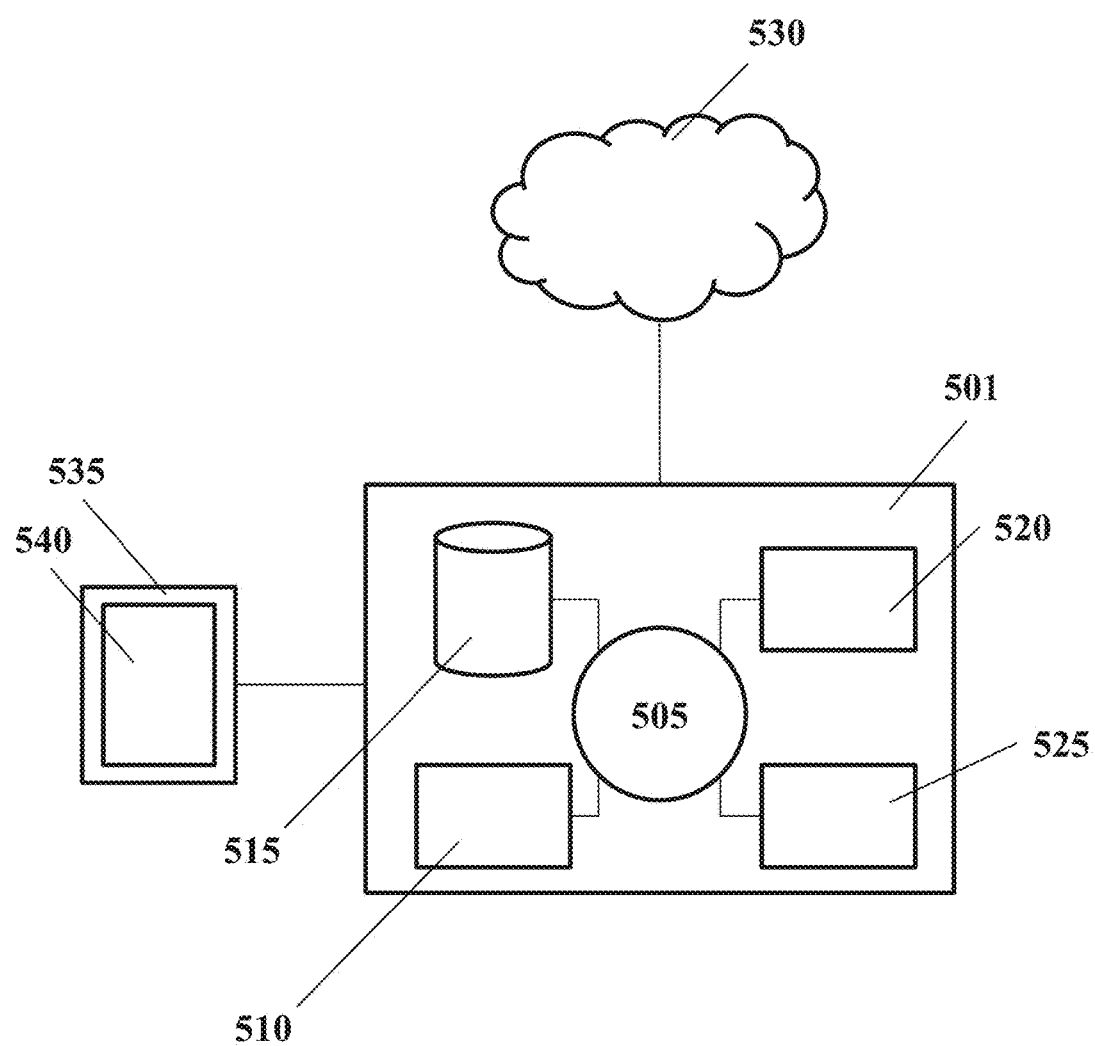
FIG. 5 shows a computer control system that is programmed or otherwise configured to implement methods provided herein.

The present disclosure provides computer control systems that are programmed to implement methods of the disclosure. FIG. 5 shows a computer system 501 that is programmed or otherwise configured to compress ultrasound images. The computer system 501 can regulate various aspects of ultrasound image compression of the present disclosure, such as, for example, configuring a lookup table and performing a recursive binary search method. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single-core or multi-core processor, or a plurality of processors for parallel processing. The computer system 501 also includes memory or memory location 510 (e.g., random-access memory (RAM), read-only memory (ROM), or flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, a means for user selection of a monotonic function and/or a number of output bits n. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, perform a recursive binary search method.

Figure 6A:
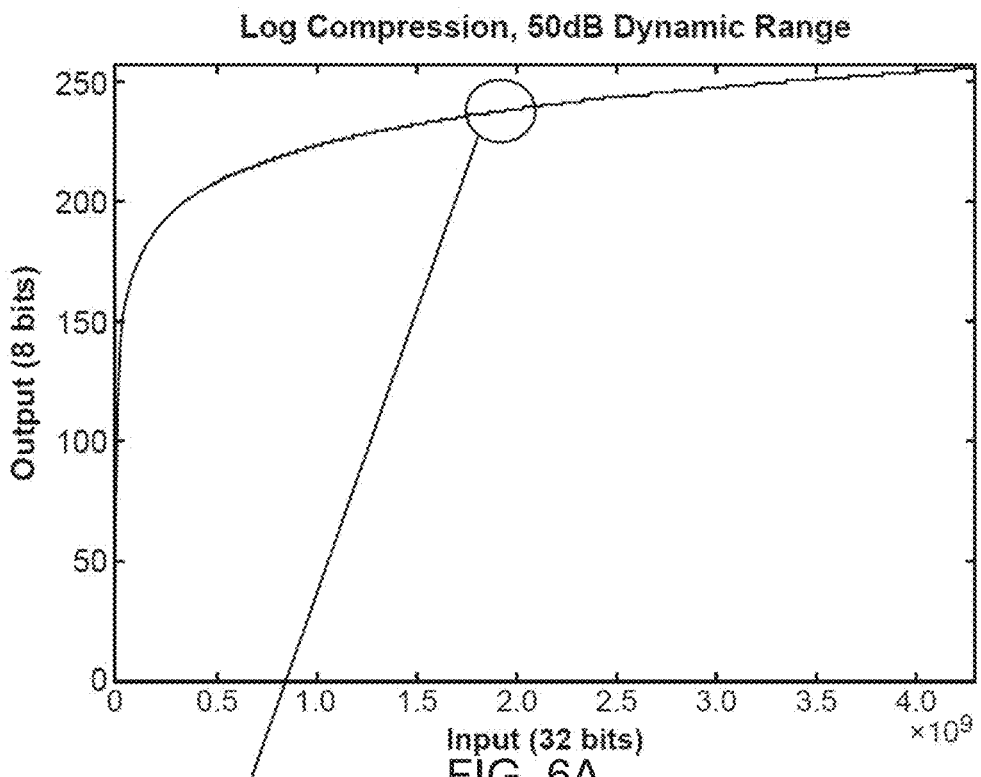
FIG. 6A shows an example of a log compression curve applied on input words of 32-bit length to obtain output words of 8-bit length.
Figure 6B:
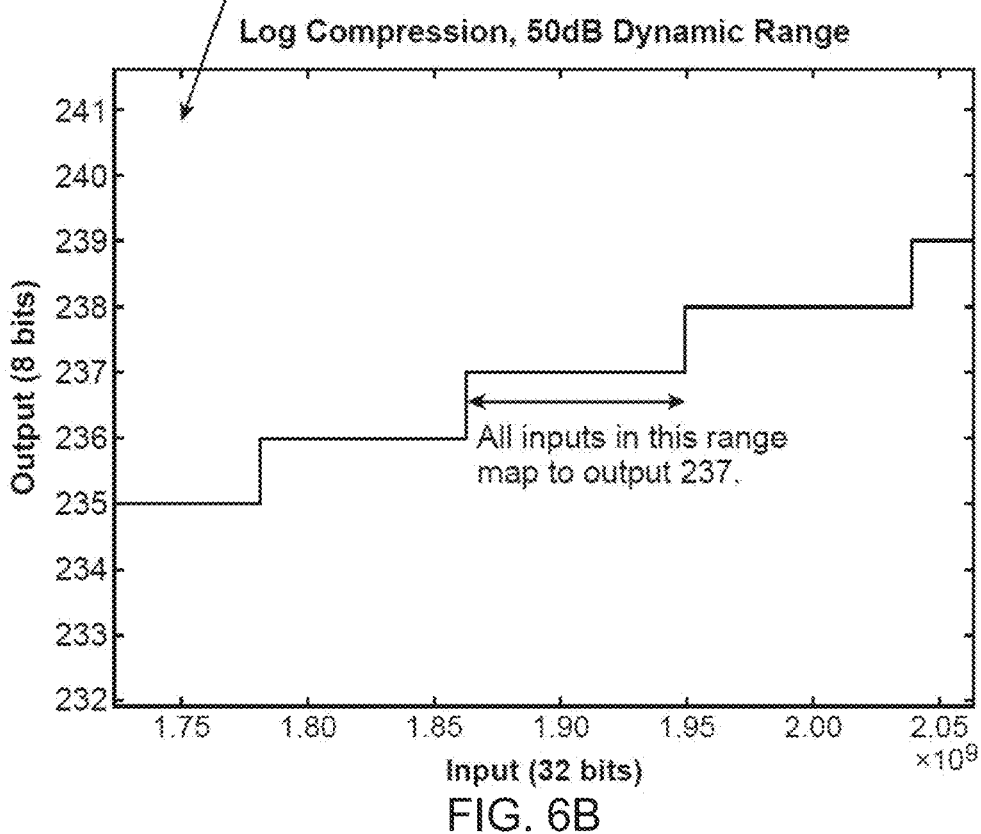
FIG. 6B shows an example of a zoomed-in portion of the log compression curve of FIG. 6A showing discrete output values corresponding to ranges of input values.

FIGS. 6A and 6B illustrate an example of a log (logarithmic) compression curve, which may be used for some embodiments described herein. A log compression curve is used to illustrate an example of a compression curve that may be used for dynamic range compression. In general, the compression curve may be any curve that monotonically increases or decreases over a given range of input values. The number of output bits may be less than the number of input bits.

FIG. 6A shows an example of a log compression curve applied on input words of 32-bit length to obtain output words of 8-bit length. In this example, the input words may be 32-bit length unsigned integers, and may range in value from $00000000_{16}$ (where the 16 subscript indicates values in hexadecimal or base 16) to $FFFFFFFF_{16}$ (or $2^{32}-1=4.29 \times 10^9$). The output values may be 8-bit length unsigned integers, and may range in value from $00_{16}$ to $FF_{16}$ (or $2^8-1=255$). For example, for this log compression function, a 32-bit input value of $00000000_{16}$ would map to an 8-bit output value of $00_{16}=00000000_2$ (where the 2 subscript indicates values in binary or base 2), and a 32-bit input value of $FFFFFFFF_{16}$ would map to an 8-bit output value of $FF_{16}=11111111_2$. Since the size of the range of input values is about $2^{32-8}=1.68 \times 10^7$ times the size of the range of output values, there may be many input values (e.g., integers) that map to the same given output value (e.g., integers).

FIG. 6B shows an example of a zoomed-in portion of the log compression curve showing discrete output values corresponding to ranges of input values. This zoomed-in portion shows a range of input values of approximately $1.7 \times 10^9$ to $2.06 \times 10^9$ and a range of output values of approximately 232 to 242. In this range of log compression function values, each of five contiguous and mutually exclusive ranges of input values maps to one of five discrete possibilities of output values (235, 236, 237, 238, and 239). For example, all inputs in the range indicated by the double-arrowed line segment (in red) map to an output value of 237. This range can be represented by two threshold values, such that all input values between these two threshold values (e.g., greater than or equal to the smaller threshold value among the pair of threshold values, and less than the larger threshold value among the pair of threshold values) map to the same output value. Hence, a log compression function reduces the number of bits needed to represent an input value (e.g. 32 bits) by mapping said input value to an output value with fewer bits (e.g. 8 bits).

After a compression function has been used to map each of one or more input values (with a number of input bits m) to a corresponding output value (with a number of output bits n), where n<m, a look-up table may store the $(2^n-1)$ input threshold values (e.g., th$\{1\}$, th$\{2\}$, th$\{2^n-1\}$) corresponding to the $2^n$ possible output values. The first (e.g., smallest) of the possible output values may correspond to all input values less than th$\{1\}$ (e.g., the first threshold value among the set of input threshold values). The second (e.g., second smallest) of the possible output values may correspond to all input values between th$\{1\}$ and th$\{2\}$ (e.g., greater than or equal to th$\{1\}$, and less than th$\{2\}$). In general, the $i^{th}$ (e.g., $i^{th}$ smallest) of the possible output values may correspond to all input values between th$\{i-1\}$ and th$\{i\}$ (e.g., greater than or equal to th$\{i-1\}$, and less than th$\{i\}$). The largest of the possible output values may correspond to all input values greater than or equal to th$\{2^n-1\}$. The size of the lookup table may be m·$(2^n-1)$ bits. The set of threshold values may be generated using a compression function (e.g., a log compression function).

The particular number of bits may vary, depending on the particular implementations. For example, there may be 8-bit output values, in which case there could be 8 stages where each input value is compared against 8 threshold values. In some implementations, the number of output values is limited to 256 output values (e.g., 0 to 255).

As described herein, in various implementations, generation of the processed image data may be based on a predetermined table, such as table 320 (e.g., a lookup table). For example, the processed image data may be based on output values determined from table 320, where image processor 318 may determine the output values based on the input values, or dynamic subranges into which the input values fall.

In various implementations, the predetermined table includes predetermined thresholds associated with the dynamic subranges. In various implementations, the predetermined table maps input values to the output values based on the predetermined thresholds. In some implementations, each output value is associated with a unique dynamic subrange. For example, in some implementations, table 320 may store $(2^n-1)$ input threshold values (e.g., th$\{1\}$, th$\{2^n-1\}$), where table 320 may have a size of m·$(2^n-1)$ bits, and where n is the number of output bits and m is the number of input bits.

The lookup table may be used to find a function output value ("output"), given an input value ("input"), as follows. If input <th$\{1\}$, the output is 0. If input is greater than or equal to th$\{2^n-1\}$, the output is $(2^n-1)$. If input is between th$\{i\}$ and th$\{i+1\}$ (e.g., greater than or equal to th$\{i\}$, and less than th$\{i+1\}$), the output is i. This procedure of finding a function output value given an input value, using a lookup table, may be referred to as "performing a lookup" in a lookup table.

Figure 7:
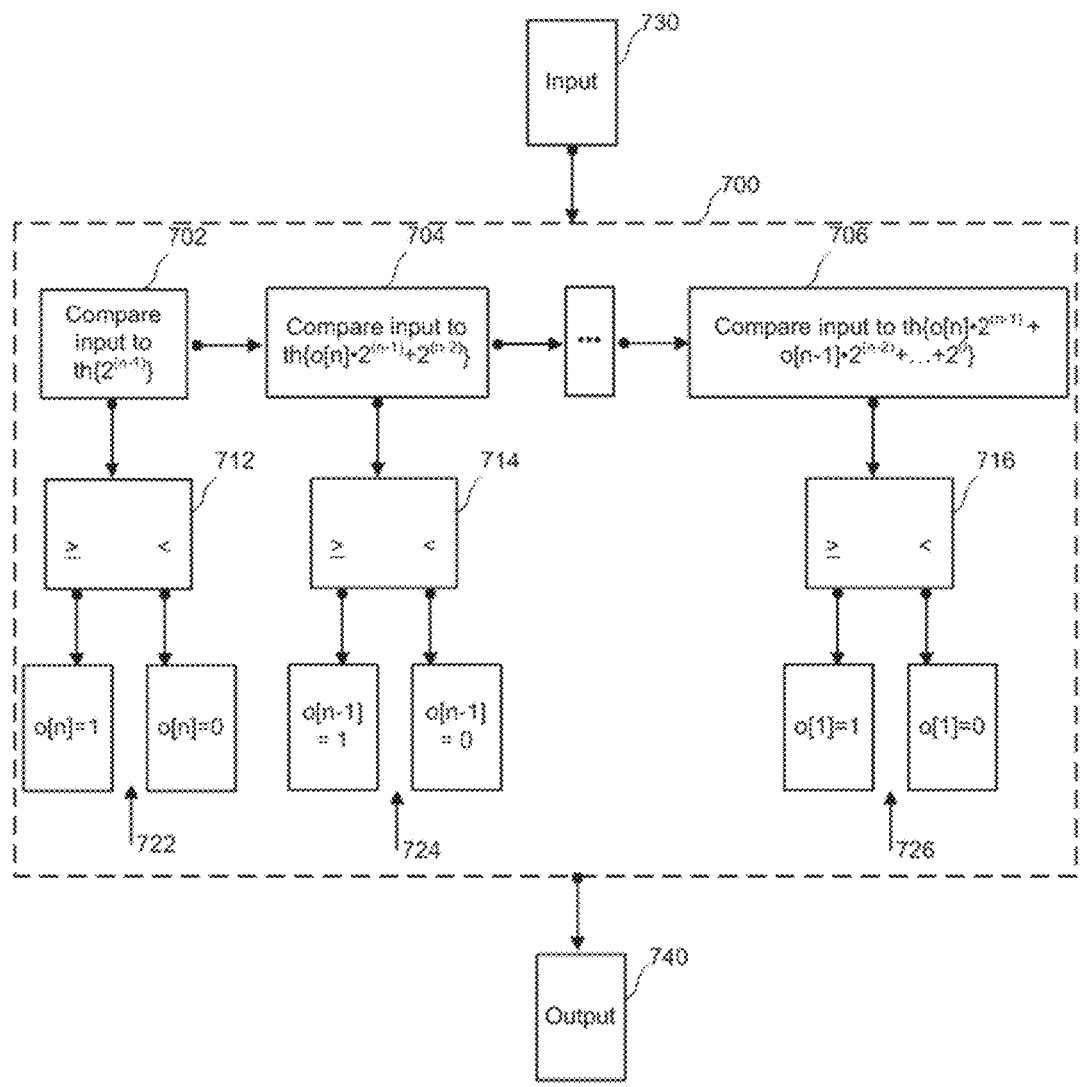
FIG. 7 illustrates a recursive binary search method to determine output values based on threshold values in a lookup table.

FIG. 7 illustrates a recursive binary search method to determine output values based on threshold values in a lookup table, which may be used for some embodiments described herein. This recursive binary search method may be performed by an apparatus to perform a lookup in a lookup table by generating the n bits of an output given an input. The binary search identifies a dynamic subrange for each input value, and maps the input values to the output values based on the dynamic subranges. In other words, in various implementations, multiple input values map to a single dynamic subrange, and each dynamic subrange maps to a single output value. As such, one or more of the input values are associated with a single output value. Stated differently, each output value is associated with one or more input values (or in some cases, possibly no input values). This binary search may comprise taking each input number and comparing said input number to different subdynamic range thresholds in order to determine in which subdynamic range each input number falls, where each dynamic subrange maps to a particular output value. Other types of search methods may be used to identify threshold values with a lookup table, e.g. a linear search.

As shown in FIG. 7, the recursive binary search method 700 may be performed as follows. In each of n stages of the recursive binary search method 700, given an input value (or "input") 730, one bit of the n bits that comprise the output value (or "output") 740 may be generated (e.g., beginning with the most significant bit (MSB) of the output value (o[n]) in the first stage of the n stages, and ending with the least significant bit (LSB) of the output value (o[1]) in the nth stage of the n stages (the final stage)). Each stage may comprise a comparison step and a bit assignment step.

At step 702, in the first stage of the recursive binary search method, the input 730 is compared to th$\{2^{(n-1)}\}$. At comparison step 712, a comparison is performed (e.g., using one or more comparators) to determine whether (1) the first value is greater than or equal to the second value or (2) the first value is less than the second value. At bit assignment step 722, the comparison of comparison step 712 determines a first bit of the n bits to be assigned to the output value 740. If the input 730 is greater than or equal to th$\{2^{(n-1)}\}$ (e.g., case (1) of comparison step 712), the most significant bit (MSB) of the output (o[n]) is set to 1 (e.g., o[n]=1). If the input 730 is less than th$\{2^{(n-1)}\}$ (e.g., case (2) of comparison step 712), the MSB of the output (o[n]) is set to 0 (e.g., o[n]=0).

At step 704, in the second stage of the recursive binary search method, the input is compared to th$\{o[n] \cdot 2^{(n-1)} + 2^{(n-2)}\}$. At comparison step 714, a comparison is performed (e.g., using one or more comparators) to determine whether (1) the first value is greater than or equal to the second value or (2) the first value is less than the second value. At bit assignment step 724, the comparison of step 714 determines a second bit of the n bits to be assigned to the output value 740. If the input 730 is greater than or equal to th$\{o[n] \cdot 2^{(n-1)} + 2^{(n-2)}\}$ (e.g., case (1) of comparison step 714), the second MSB of the output (o[n−1]) is set to 1 (e.g., o[n−1]=1). If the input 730 is less than th$\{o[n] \cdot 2^{(n-1)} + 2^{(n-2)}\}$ (e.g., case (2) of comparison step 714), the second MSB of the output (o[n−1]) is set to 0 (e.g., o[n−1]=0).

Similarly to the performing of the first two stages, in the third stage of the recursive binary search method, the input is compared to th$\{o[n] \cdot 2^{(n-1)} + o[n-1] \cdot 2^{(n-2)} + 2^{(n-3)}\}$. At the third comparison step, a comparison is performed (e.g., using one or more comparators) to determine whether (1) the first value is greater than or equal to the second value or (2) the first value is less than the second value. At the third bit assignment step, this comparison determines a third bit of the n bits to be assigned to the output value 740. If the input 730 is greater than or equal to th$\{o[n] \cdot 2^{(n-1)} + o[n-1] \cdot 2^{(n-2)} + 2^{(n-3)}\}$, the third MSB of the output (o[n−2]) is set to 1 (e.g., o[n−2]=1). If the input 730 is less than th$\{o[n] \cdot 2^{(n-1)} + o[n-1] 2^{(n-2)} + 2^{(n-3)}\}$, the third MSB of the output (o[n−2]) is set to 0 (e.g., o[n−2]=0).

This recursive binary search method may repeat for all n stages until all n bits of the output value 740 are calculated. At step 706, in the nth stage of the recursive binary search method, the input is compared to th$\{o[n] \cdot 2^{(n-1)} + o[n-1] \cdot 2^{(n-2)} + \ldots + 2^0\}$. At comparison step 716, a comparison is performed (e.g., using one or more comparators) to determine whether (1) the first value is greater than or equal to the second value or (2) the first value is less than the second value. At bit assignment step 726, the comparison of comparison step 716 determines an nth bit (e.g., the least significant bit (LSB)) of the n bits to be assigned to the output value 740. If the input 730 is greater than or equal to th$\{o[n] \cdot 2^{(n-1)} + o[n-1] \cdot 2^{(n-2)} + \ldots + 2^0\}$ (e.g. case (1) of comparison step 716), the LSB of the output (o[1]) is set to 1 (e.g., o[1]=1). If the input 730 is less than th$\{o[n] \cdot 2^{(n-1)} + o[n-1] \cdot 2^{(n-2)} + \ldots + 2^0\}$ (e.g., case (2) of comparison step 716), the LSB of the output (o[1]) is set to 0 (e.g., o[1]=0). In this manner, each successive stage of the recursive binary search method may generate a successive bit of the output 740, and performing all n stages of the recursive binary search method 700 may generate all n bits of the output value 740.

Although FIG. 7 shows a recursive binary search method in accordance with an embodiment, a person of ordinary skill in the art will recognize many adaptations and variations. For example, the steps can be performed in any order. Some of the steps may be removed, some of the steps can be repeated, and additional steps can be performed.

In some implementations, the stages of the binary search are performed in series and form a serialized pipeline such that the incoming stream of input values is accepted at a constant rate. In various implementations, no buffer for the incoming input values is required. Once a particular input value passes from the first stage to the second stage, the next input value may come into the first stage. Such pipelining may occur at each stage.

TABLE 2

| Stage Number | Threshold Values Needed | Concatenated Stages for Output |
|---|---|---|
| 1st | th$\{2^{(n-1)}\}$ (th$\{1000 \ldots 00\text{'b}\}$) | |
| 2nd | th$\{2^{(n-2)}\}$ th$\{2^{(n-1)} + 2^{(n-2)}\}$ (th$\{X100 \ldots 00\text{'b}\}$) | where X is the comparator output of the first stage |
| 3rd | th$\{XX10 \ldots 00\text{'b}\}$ | XX is the concatenated output of the first two comparators |
| . . . | . . . | . . . |
| nth | th$\{XXXX \ldots X1\text{'b}\}$ | XXXX . . . X is the concatenated output of all the previous comparators |

Table 2 illustrates a method to perform lookup table segmentation, which may be used for some embodiments described herein. The lookup table may be divided in n sub-tables for the n stages. For example, for an 8-bit output function, table 320 may be divided into 8 sub-tables in an 8-stage implementation. The table data needed in the individual stages of the recursive binary search method may be mutually exclusive. For example, only th$\{2^{(n-1)}\}$ is needed in the first stage, e.g. to generate the MSB of the output value (e.g., in binary, th$\{1000 \ldots 00\text{'b}\}$). Only th$\{2^{(n-2)}\}$ and th$\{2^{(n-1)} + 2^{(n-2)}\}$ are needed in the second stage (e.g., in binary, th$\{X100 \ldots 00\text{'b}\}$, where X is the comparator output of the first stage). Only th$\{XX10 \ldots 00\text{'b}\}$ are needed in the third stage, where XX is the concatenated output of the first two comparators. This reasoning can be applied to each successive stage, until only th$\{XXXX \ldots X1\text{'b}\}$ are needed in the last stage, where XXXX . . . X is the concatenated output of all the previous comparators. The address to the sub-table may be the concatenated comparator output of all the previous stages. Further, the final output of the function may be the concatenated output of all n comparators.

In various implementations, image processor 318 functions as a compression module, where the number of output values may be limited to a predetermined number of output values (e.g., 256 output values ranging from 0 to 255, etc.).

In various implementations, image processor 318 converts the input values of the raw image data to a grayscale range, where image processor 318 associates the output values with shades of gray for display. In some implementations, the input values fall within a first dynamic range, and the output values fall within a second dynamic range, which is smaller than the first dynamic range. For example, the raw image data may provide an image that includes 14 bits or 16 bits per pixel. Image processor 318 compresses the raw image data and generates an image that is 8 bits per pixel, which provides 256 different shades of gray.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations provide processed image data that is high-quality and that comprises pixels having compressed dynamic range. Implementations provide a compressed dynamic range without compromising spatial resolution.

Figure 8:
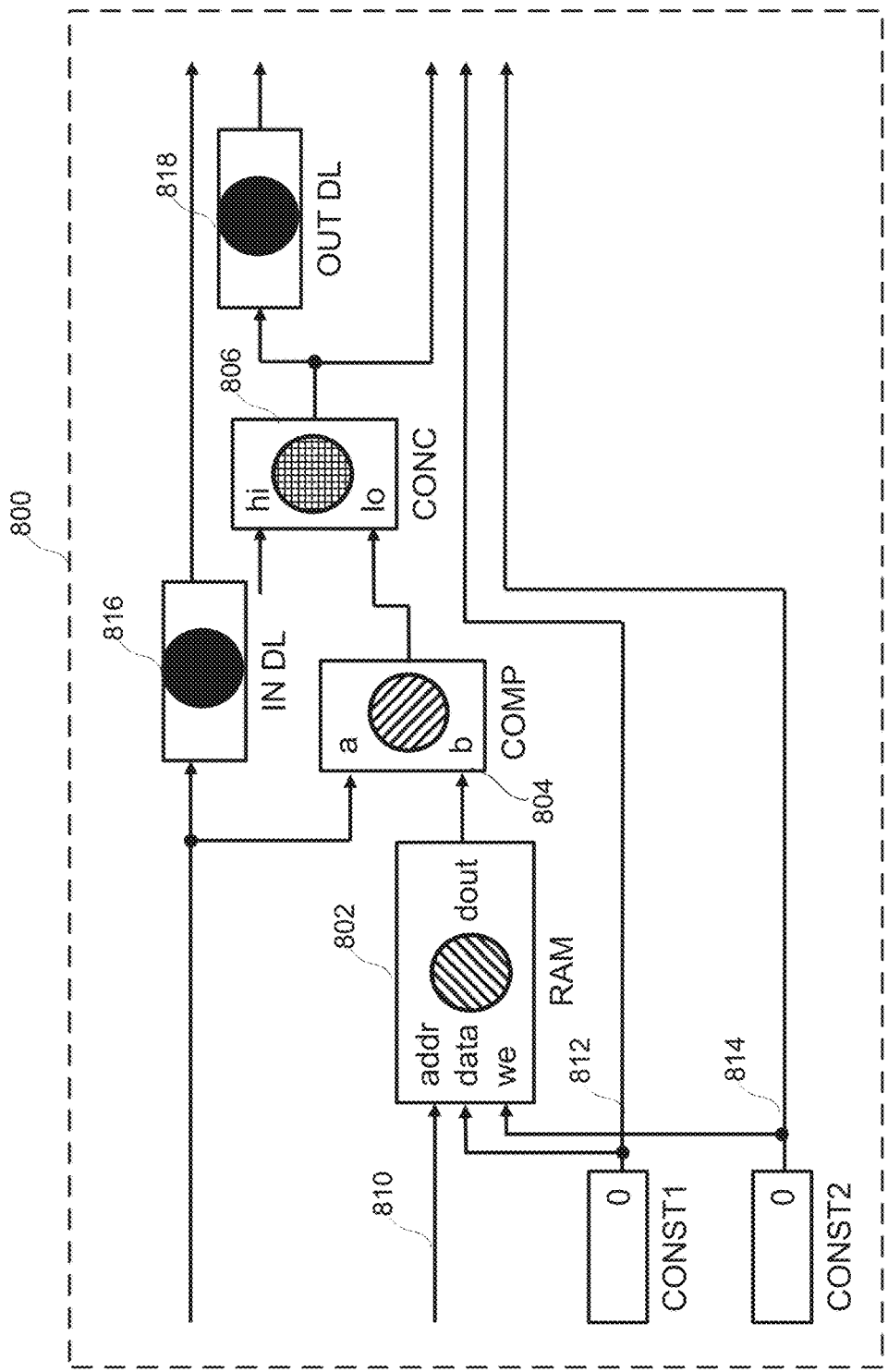
FIG. 8 illustrates a block diagram showing an example hardware implementation of one stage of a dynamic range data compression method.
Figure 9:
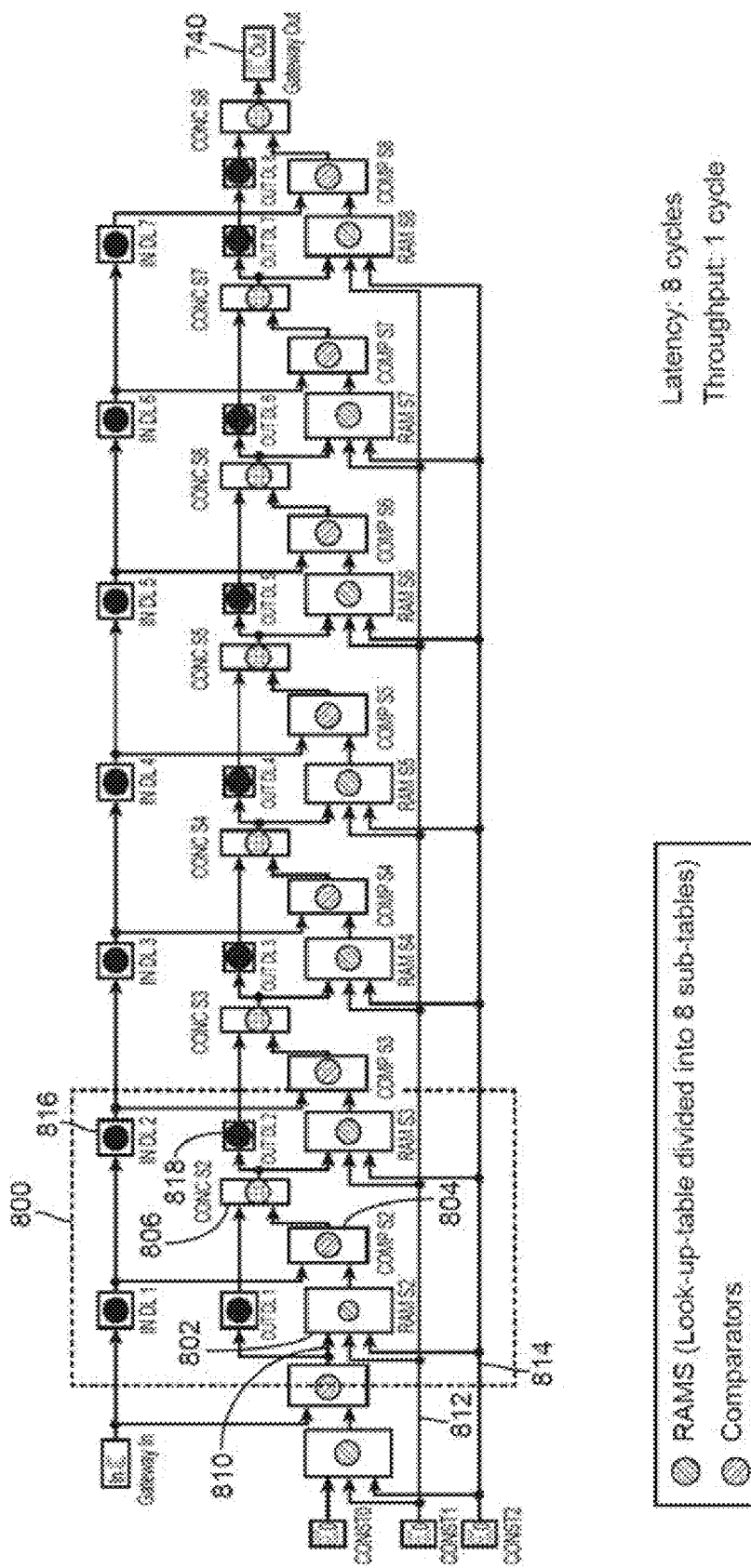
FIG. 9 illustrates a block diagram showing an example hardware implementation of an 8-stage dynamic range data compression method.

FIG. 8 illustrates a block diagram showing an example hardware implementation of one stage of an n-stage dynamic range data compression circuit, which may be used for some embodiments described therein. FIG. 9 illustrates a block diagram showing an example hardware implementation of an 8-stage dynamic range data compression circuit, which may be used for some embodiments described therein. The hardware implementation shown here comprises 8 stages but in general may be configured to comprise n stages, where n may be any integer value of at least 2. Each stage 800 of the 8 stages may comprise one or more RAMs 802, one or more comparators 804, one or more concatenators 806, and one or more delays (e.g., an input delay 816 and/or an output delay 818), as described elsewhere herein. Each RAM 802 may have one or more inputs (e.g., ADDR (address) 810, DATA 812, WE (write enable) 814, etc.) and one or more outputs (e.g. DOUT, data out). ADDR 810 may be the input address for the RAM 802 to read from or write to. For the first stage in the plurality of stages, ADDR 810 may be hardcoded at 0 (e.g., by a constant value CONST0) for the first-stage RAM (e.g., S1) 802. Alternatively or in combination, a first-stage RAM 802 may be implemented using a simple register, as it stores only a single value. For a stage that is not the first stage in the plurality of stages, ADDR 810 may comprise a concatenation of outputs from all the previous stages (as described elsewhere herein) for lookup into a sub-table stored in the RAM 802. In the $i^{th}$ stage, ADDR 810 may comprise (i−1) bits (e.g., a concatenation of outputs from all the previous (i−1) stages). ADDR 810 may comprise no more than the number n of bits (e.g., dynamic range) corresponding to the compressed data (e.g., compressed pixels).

DATA 812 may be the data to be written into the RAM S1 802. DATA 812 may be hardcoded at 0 (e.g., by a constant value CONST1) for a logic circuit that does not need to write data. DATA 812 may be set at 0 (e.g., by a constant value CONST1) for one or more clock cycles during which the logic circuit does not need to write data. WE 814 may be the write enable signal for the RAM 802. WE 814 may be hardcoded at 0 (e.g., by a constant value CONST2) for a logic circuit that does not need to write data. WE 814 may be set at 0 (e.g., by a constant value CONST2) for one or more clock cycles during which the logic circuit does not need to write data. DOUT for a RAM 802 may comprise a lookup table value retrieved at a given stage, e.g., during a recursive binary search method. Comparators 804 for a given stage may generate bitwise values of a portion of output words, as described elsewhere herein. Concatenators 806 may concatenate (e.g., join together) a bit of the output word generated at a given stage with one or more bits generated from previous stages.

An apparatus for compressing input words of m bits to output words of n bits, wherein n<m, may comprise a plurality of n memory components, each memory component configured to store a respective sub-table of a lookup table, wherein the lookup table comprises a plurality of ordered threshold values, the threshold values corresponding to a domain of a monotonic function and respective indices of the threshold values as ordered corresponding to a range of the monotonic function; and a logic circuit comprising bitwise operations for: determining, in a plurality of n stages respectively corresponding to the plurality of n sub-tables, based on an input word and the plurality of n sub-tables, a plurality of n bits of an output word; and concatenating the plurality of n bits to generate the output word.

Each memory component of the apparatus may be configured to store a respective sub-table of a lookup table. The memory components may be different sizes. For example, each memory component may be the smallest commonly available size (e.g., a size corresponding to a number of bits that is a power of 2) that is sufficient to fit an entire sub-table of the plurality of sub-tables that comprise a lookup table. The memory components may be the same size. For example, each memory component may be the smallest commonly available size (e.g., a size corresponding to a number of bits that is a power of 2) that is sufficient to fit the entirety of the largest sub-table of the plurality of sub-tables that comprise a lookup table.

The logic circuit may be exemplified by the block diagram shown in FIG. 8 and FIG. 9. The logic circuit may comprise one or more RAMs 802, one or more comparators 804, one or more concatenators 806, and one or more delays (e.g., an input delay 816 and/or an output delay 818). Each RAM 802 of the one or more RAMs may store a sub-table of a stage. Each comparator 804 of the one or more comparators may have an output that is a bit of the final output value. Each comparator 804 of the one or more comparators may determine a bit of an address into the RAM 802 associated with the sub-table of a stage, as described in Table 2. Each concatenator 806 of the one or more concatenators may concatenate the comparator output of a given stage with the concatenated bit or bits calculated and concatenated from previous stages. Each delay (e.g., an input delay 816 and/or an output delay 818) of the one or more delays may be used for pipelining and synchronizing different data paths.

Figure 10:
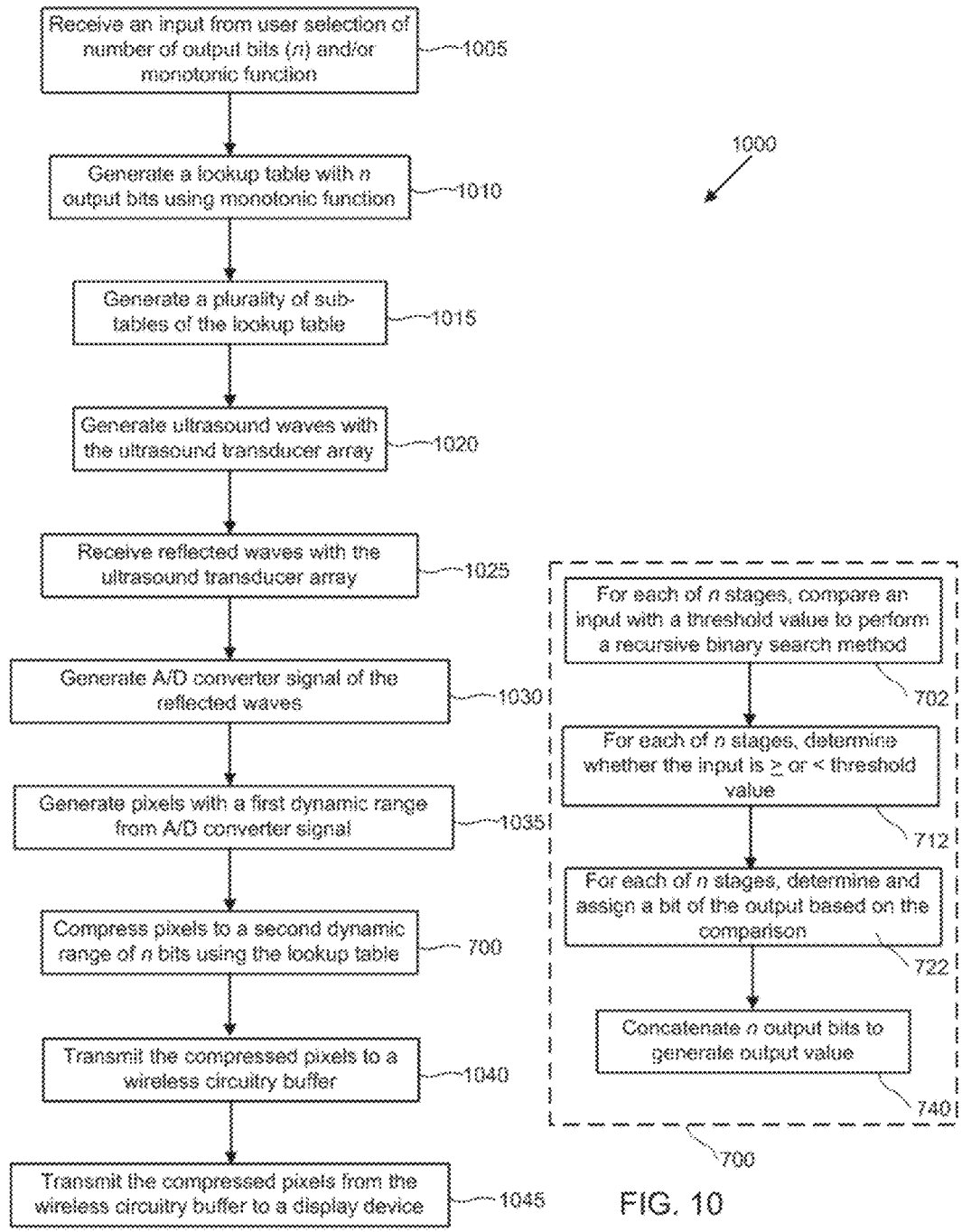
FIG. 10 illustrates a flowchart showing an example of steps to perform dynamic range image compression on a handheld ultrasound probe device.

FIG. 10 illustrates a method 1000 to perform image dynamic range compression on a handheld ultrasound probe device. In step 1005, an input is received from user selection of a number of output bits (n) and/or a monotonic function. In step 1010, a lookup table is generated after receiving a user input of n bits (e.g., the number of output bits) and the monotonic function. The lookup table may comprise $(2^n)-1$ entries, and each data entry may comprise m bits (e.g., the number of input bits). Next, in step 1015, a plurality of sub-tables of the lookup table is generated. Next, in step 1020, ultrasound waves are generated with the ultrasound transducer array. Next, in step 1025, reflected waves are received with the ultrasound transducer array. Next, in step 1030, the A/D converter generates an A/D converter signal of the reflected waves. Next, in step 1035, this A/D converter signal may be beamformed by a beamformer to generate input data (e.g., pixel data) with a first dynamic range. Next, in step 700, the generated pixels are compressed to a second dynamic range of n bits less than the first dynamic range using the lookup table. Next, in step 1040, the dynamic range compressed pixels are transmitted to a wireless circuitry buffer. Finally, in step 1045, the dynamic range compressed pixels are transmitted from the wireless circuitry buffer to a display device. In steps 1040 and/or 1045, the wireless circuitry buffer may alternatively or in combination be implemented using a wired communication connection or link.

As described elsewhere herein, step 700 may comprise steps 702, 712, 722, and 740. In step 702, for each of n stages, the input is compared with a threshold value to perform a recursive binary search method. Next, for each of n stages (e.g., in step 712), the determination is made whether the input is ≥ (greater than or equal to) or < (less than) the threshold value. Next, for each of n stages (e.g., in step 722), a bit of the output is determined and assigned based on the comparison (e.g., step 712). Finally, the n output bits are concatenated to generate the output value 740.

Although FIG. 10 shows a method of dynamic range compression in accordance with some embodiments, a person of ordinary skill in the art will recognized many adaptations and variations. For example, the steps may be performed in any order. Some of the steps may be removed, some of the steps repeated, and additional steps performed.

The logic circuit may comprise a latency and a throughput. The apparatus may perform the plurality of n stages inn clock cycles ("cycles"). The latency of the circuit may comprise a sum of all delays (each delay corresponding to each stage) of all stages in the circuit. The latency of determining the plurality of bits of an output word may be at most n clock cycles. The latency of determining the plurality of bits of an output word may be n clock cycles. For example, an 8-stage implementation for an 8-bit output function may have a latency of 8 clock cycles. The cycle time (in seconds, s) may be the inverse of the clock frequency (in Hertz, Hz) of the processor.

The throughput of the circuit may comprise the delay time needed to calculate an output bit of a stage. The throughput of the circuit may be expressed as the rate of output words generated per clock cycle. Each stage of the plurality of stages may be performed in one clock cycle. The plurality of n stages may be configured in a pipeline to enable differently positioned bits of a plurality of output words to each be determined by a respective corresponding stage of the plurality of stages in a same clock cycle. In this way, an n-stage implementation for an n-bit output function may have a throughput of one output word per one clock cycle. A throughput of the logic circuit may be at least one output word per clock cycle.

An application-specific integrated circuit (ASIC) may comprise the logic circuit. A field-programmable gate array (FPGA) may comprise the logic circuit.

The apparatus may determine the plurality of n bits of the output word by performing comparisons of the input word to no more than n threshold values. This determining may be implemented by a recursive binary search method. This determining may be implemented by a search method with an expected runtime that is logarithmic order in base 2 with the number of threshold values searched, e.g., uniform binary search, Fibonacci search, exponential search, interpolation search, or fractional cascading.

The apparatus may determine the plurality of bits of the output word based on comparing the input word to a selected threshold value at each stage of the plurality of stages, the threshold value at each respective stage after the first stage being selected based on the bits of the output word determined in previous stages of the plurality of stages. For example, the recursive binary search method of FIG. 7 compares the input word to a selected threshold value at each stage of the plurality of stages. The determining of the plurality of bits of the output word may comprise: in a first stage of the plurality of stages, determining, based on a first sub-table stored in a first memory component of the plurality of memory components, a most significant bit (MSB) of the output word. This determining may be based on comparing the input word to a first threshold value stored in a first memory component of the plurality of memory components.

In each successive stage of the plurality of stages, the next most significant bit of the output word may be determined. This determining may be based on one or more corresponding additional sub-tables of the plurality of sub-tables and the most significant bit. This determining may be based on the respective sub-table stored in the corresponding memory component and bits of the output word determined in previous stages of the plurality of stages, a next bit of the output word corresponding to the respective stage. In each successive stage after the first stage of the plurality of stages, the bits of the output word may be determined based on bits determined in previous stages of the plurality of stages, which may also be used as an address of a threshold value in the memory component corresponding to the respective stage, and determining, based on comparing the input word to the threshold value at the address, a next bit of the output word corresponding to the respective stage.

Each sub-table of the lookup table of the apparatus may correspond to a respective level of a binary search tree. Each memory component may correspond to a respective level of a binary search tree. The determining of the plurality of bits of the output word may comprise searching the binary tree.

The plurality of threshold values of the apparatus may be at most $2^n-1$ threshold values. The plurality of threshold values of the apparatus may be $2^n-1$ threshold values. A size of the lookup table of the apparatus may be at most $m \cdot (2^n-1)$ bits. A size of the lookup table of the apparatus may be $m \cdot (2^n-1)$ bits.

The apparatus may comprise a means for dividing up the lookup table into the plurality of sub-tables. Each ith sub-table of the plurality of n sub-tables in the apparatus may comprise at most $2^{(i-1)}$ threshold values of the plurality of threshold values. Each ith sub-table of the plurality of n sub-tables in the apparatus may comprise $2^{(i-1)}$ threshold values of the plurality of threshold values.

Each $i^{th}$ memory component of the plurality of n memory components may be configured to store at least $m \cdot (2^{(i-1)})$ bits. Each $i^{th}$ memory component of the plurality of n memory components may be configured to store at most $m \cdot (2^{(i-1)})$ bits.

The plurality of memory components may be read-only memory (ROM). The plurality of memory components may be random-access memory (RAM).

Then bits of the apparatus may be 1, 2, 4, 8, 16, 32, 64, 128, 256, 512, 1024, or 2048 bits, or any number of bits between these values. The m bits of the apparatus may be 2, 4, 8, 16, 32, 64, 128, 256, 512, 1024, or 2048 bits, or any number of bits between these values.

The input words of the apparatus may represent an image with a first dynamic range, and the output words may represent the image with a second dynamic range less than the first dynamic range. This image may be ultrasound image data. This image may be image data generated by computed tomography (CT), magnetic resonance imaging (MM), positron emission tomography (PET), PET-CT, single-photon emission computed tomography (SPECT), X-ray radiography, thermography, endoscopy, elastography, or other medical imaging modality.

A system for compressing medical imaging data, such as ultrasound image data, may comprise a means for receiving ultrasound image data at a bitrate corresponding to m, and the apparatus for compressing the ultrasound image data to a bitrate corresponding to n. The system may be configured to compress live ultrasound data in real time to the bitrate corresponding to n. The system may comprise a means for outputting the live ultrasound image data for display at the bitrate corresponding to n. This bitrate may be achieved by using a processor with a clock cycle sufficient to achieve a necessary throughput of data compression.

The system may comprise a means for generating the plurality of threshold values based on n and the monotonic function. The system may comprise a means for storing the plurality of threshold values in the plurality of n memory components. The system may comprise a means for storing the plurality of threshold values in a plurality of at least n memory components. The system may comprise a means for storing the plurality of threshold values in a plurality of at most n memory components. The system may comprise a means for storing the plurality of threshold values in a single memory component.

The system may comprise a means for receiving a user selection of n. The system may be configured to have a non-user selected value of n. The system may comprise a means for receiving a user selection of the monotonic function. This monotonic function may be selected from a set of a plurality of predetermined monotonic functions. The system may be configured to have a non-user selected monotonic function.

The monotonic function of the apparatus may be configured in many ways, such as a logarithmic function. The monotonic function of the apparatus may be an exponential function. The monotonic function of the apparatus may be a gamma function (e.g., $y=x^{\gamma}$ gamma, where $0<\text{gamma}<1$). The monotonic function of the apparatus may be a polynomial function (e.g., monomial or binomial). The monotonic function may be a composite function of two or more monotonic functions (e.g., a logarithmic function and a gamma function). The monotonic function may be an arithmetic combination (e.g., a sum, a weighted sum, or a product) of two or more monotonic functions.

A portable device for real-time ultrasound imaging (or another type of medical imaging) may comprise the apparatus for compressing input words of m bits to output words of n bits, wherein n<m.

A logic circuit for compressing input words of m bits to output words of n bits, wherein n<m, may comprise bitwise operations for: determining, in a plurality of n pipeline stages respectively corresponding to a plurality of n sub-tables of a lookup table, wherein the lookup table comprises a plurality of $(2^n)-1$ ordered threshold values and each $i^{th}$ sub-table of the n sub-tables comprises $2^{(i-1)}$ threshold values, the threshold values corresponding to a domain of a monotonic function and respective indices of the threshold values as ordered corresponding to a range of the monotonic function, a plurality of n bits of an output word; and concatenating the plurality of n bits to generate the output word; wherein a latency of the logic circuit is at most n clock cycles and a throughput of the logic circuit is at least one output word per cycle.

An apparatus for compressing input words of m bits to output words of n bits, wherein n<m, may comprise the logic circuit and a plurality of n memory components respectively corresponding to the n pipeline stages and n sub-tables, each memory component comprising at least a minimum size necessary to store the corresponding sub-table of the plurality of n sub-tables.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nano-engineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD, or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Although reference is made to compression of data on a hand held imaging probe, the methods, apparatus and circuitry disclosed herein will find application in many fields, such as electronics, imaging, automobiles, and telecommunications.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A handheld ultrasound probe for generating a compressed pixel of an ultrasound image, comprising:
    an ultrasound transducer array;
    an analog-to-digital (A/D) converter coupled to the ultrasound transducer array to acquire ultrasound data; and
    a processor coupled to the A/D converter, the processor configured with instructions that, when executed, cause the processor to:
        generate a first word corresponding to an uncompressed pixel of the ultrasound image, wherein the first word corresponds to a first intensity resolution of the uncompressed pixel, and wherein the first word comprises a first dynamic range comprising a first number of bits, and
        generate the compressed pixel by compressing the first word in accordance with a lookup table to produce a second word corresponding to the compressed pixel, wherein the second word corresponds to a second intensity resolution of the compressed pixel, and wherein the second word comprises a second dynamic range comprising a second number of bits, the second number of bits less than the first number of bits.

2. The handheld ultrasound probe of claim 1, wherein the lookup table comprises a plurality of sub-tables, wherein each sub-table of the plurality of sub-tables of the lookup table corresponds to a respective level of a binary search tree, and wherein generating the compressed pixel comprises searching the binary search tree.

3. The handheld ultrasound probe of claim 2, wherein the first word comprises m bits and the second word comprises n bits, and wherein the processor further comprises a logic circuit comprising bitwise operations for:
    determining the n bits of the second word, in a plurality of n stages respectively corresponding to the plurality of n sub-tables, based on the m bits of the first word and the plurality of n sub-tables; and
    concatenating the n bits to generate the second word.

4. The handheld ultrasound probe of claim 1, wherein the lookup table comprises a plurality of ordered threshold values, the plurality of ordered threshold values corresponding to a domain of a monotonic function and respective indices of the plurality of ordered threshold values as ordered corresponding to a range of the monotonic function.

5. The handheld ultrasound probe of claim 1, further comprising a wireless communication circuitry coupled to the processor, the wireless communication circuitry comprising a buffer, wherein the wireless communication circuitry and the processor are configured to transmit the second word corresponding to the compressed pixel to the buffer.

6. The handheld ultrasound probe of claim 5, wherein the wireless communication circuitry and the processor are configured to transmit a plurality of second words corresponding to a plurality of compressed pixels to the buffer at a rate sufficient to provide a sequence of real-time ultrasound images.

7. The handheld ultrasound probe of claim 5, wherein the processor is coupled to the buffer with a data bus having a number of bits greater than or equal to the second number of bits, and wherein the data bus is configured to transmit a plurality of second words corresponding to a plurality of compressed pixels at a rate of at least one second word per two clock cycles of the processor.

8. The handheld ultrasound probe of claim 5, wherein the wireless communication circuitry and the processor are configured to transmit a plurality of second words corresponding to a plurality of compressed pixels to the buffer at a bit rate of no more than about 30 megabits per second (Mbps) without degradation of a spatial resolution and a frame rate of the ultrasound images.

9. The handheld ultrasound probe of claim 1, wherein the first word comprises m bits and the second word comprises n bits, and wherein the handheld ultrasound probe further comprises a memory with the lookup table stored therein, the lookup table comprising at most $m\sim(2^n-1)$ bits.

10. The handheld ultrasound probe of claim 1, wherein the processor comprises a compression circuitry comprising a memory, the memory comprising a lookup table to generate the second word.

* * * * *

UNITED STATES PATENT AND TRADEMARK OFFICE
CERTIFICATE OF CORRECTION

PATENT NO. : 10,469,846 B2
APPLICATION NO. : 15/470793
DATED : November 5, 2019
INVENTOR(S) : Jung Woo Choe, Stefan Craciun and Amin Nikoozadeh Page 1 of 1

It is certified that error appears in the above-identified patent and that said Letters Patent is hereby corrected as shown below:

In the Claims

Column 24, Line 48, Claim 9, "the lookup table comprising at most $m\sim(2^n-1)$ bits" should read --the lookup table comprising at most $m\cdot(2^n-1)$ bits--.

Signed and Sealed this
Fourth Day of February, 2020

Andrei Iancu
*Director of the United States Patent and Trademark Office*